(12) United States Patent
King

(10) Patent No.: US 7,189,456 B2
(45) Date of Patent: *Mar. 13, 2007

(54) PHOTOCHROMIC OPTICAL ARTICLE

(75) Inventor: Eric M. King, Pittsburgh, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 154 days.

This patent is subject to a terminal disclaimer.

(21) Appl. No.: 10/793,589

(22) Filed: Mar. 4, 2004

(65) Prior Publication Data

US 2005/0196617 A1 Sep. 8, 2005

(51) Int. Cl.
*B32B 27/08* (2006.01)
*B32B 27/36* (2006.01)
*G03C 1/685* (2006.01)
*G03C 1/73* (2006.01)
*C09K 9/02* (2006.01)

(52) U.S. Cl. .................... 428/412; 252/582; 252/586; 351/163; 359/580; 359/586; 428/411.1; 428/423.7; 428/447; 428/480

(58) Field of Classification Search ................ 428/412, 428/411.1, 480, 447, 423.7; 252/582, 586; 351/163; 359/580, 586

See application file for complete search history.

(56) References Cited

U.S. PATENT DOCUMENTS

| | | | |
|---|---|---|---|
| 3,361,706 A | 1/1968 | Meriwether et al. ......... 260/39 |
| 3,971,872 A | 7/1976 | LeBoeuf ..................... 428/412 |
| 4,166,043 A | 8/1979 | Uhlmann et al. ........... 252/300 |
| 4,367,170 A | 1/1983 | Uhlmann et al. ........... 252/286 |
| 4,405,679 A | 9/1983 | Fujioka et al. .............. 428/216 |
| 4,526,996 A | 7/1985 | Kilgour et al. ............. 556/413 |
| 4,720,356 A | 1/1988 | Chu ........................... 252/586 |
| 4,731,264 A | 3/1988 | Lin et al. .................... 427/387 |
| 4,756,973 A | 7/1988 | Sakagami et al. .......... 428/412 |
| 4,857,630 A | 8/1989 | Kim .......................... 528/397 |
| 4,873,029 A | 10/1989 | Blum ......................... 264/1.3 |
| 4,904,525 A | 2/1990 | Taniguchi et al. .......... 428/328 |
| 4,931,220 A | 6/1990 | Haynes et al. ............. 252/586 |
| 5,051,309 A | 9/1991 | Kawaki et al. ............. 428/332 |
| 5,104,692 A | 4/1992 | Belmares ................... 427/164 |
| 5,130,353 A | 7/1992 | Fischer et al. ................ 524/43 |
| 5,134,191 A | 7/1992 | Takarada et al. ............ 524/783 |
| 5,136,014 A | 8/1992 | Figuly ........................ 528/272 |
| 5,183,862 A | 2/1993 | Figuly ........................ 525/437 |
| 5,185,390 A | 2/1993 | Fischer et al. ................ 524/43 |
| 5,231,156 A | 7/1993 | Lin ............................ 526/279 |
| 5,270,402 A | 12/1993 | Figuly ........................ 525/440 |
| 5,296,321 A | 3/1994 | Kawanishi et al. |
| 5,391,327 A | 2/1995 | Ligas et al. ................ 252/586 |
| 5,418,301 A | 5/1995 | Hult et al. .................. 525/437 |
| 5,462,866 A | 10/1995 | Wang ........................ 435/174 |
| 5,473,068 A | 12/1995 | Krongauz et al. |
| 5,580,819 A | 12/1996 | Li et al. ..................... 427/167 |
| 5,621,017 A | 4/1997 | Kobayakawa et al. ........ 522/16 |
| 5,639,802 A | 6/1997 | Neckers et al. ............... 522/25 |
| 5,645,767 A | 7/1997 | Van Gemert ................ 252/586 |
| 5,658,501 A | 8/1997 | Kumar et al. ............... 252/586 |
| 5,663,247 A | 9/1997 | Sorensen et al. ............ 525/533 |
| 5,674,941 A | 10/1997 | Cho et al. |
| 5,728,758 A | 3/1998 | Smith |
| 5,728,769 A | 3/1998 | Natesh et al. ................ 524/591 |
| 5,757,459 A | 5/1998 | Bhalakia et al. ............ 351/168 |
| 5,770,115 A | 6/1998 | Misura ....................... 252/586 |
| 5,776,376 A | 7/1998 | Nagoh et al. ............... 252/586 |
| 5,808,063 A | 9/1998 | Kumar |
| 5,827,614 A | 10/1998 | Bhalakia et al. .......... 428/411.1 |
| 5,856,860 A | 1/1999 | Bhalakia et al. ............ 351/168 |
| 5,905,148 A | 5/1999 | Krongauz et al. |
| 5,910,375 A | 6/1999 | Parker et al. ................ 428/520 |
| 5,916,669 A | 6/1999 | Parker et al. ................ 428/216 |
| 5,962,617 A | 10/1999 | Slagel ......................... 528/61 |
| 6,025,026 A | 2/2000 | Smith et al. ................ 427/316 |
| 6,060,001 A | 5/2000 | Welch et al. ............... 252/586 |

(Continued)

FOREIGN PATENT DOCUMENTS

| | | |
|---|---|---|
| EP | 0 443 803 A2 | 2/1991 |
| EP | 1238995 A1 | 9/2002 |
| EP | 1 388 749 A1 | 2/2004 |
| EP | 1433814 A1 | 6/2004 |
| JP | 1022327 | 1/1986 |
| JP | 64-30744 | 2/1989 |

(Continued)

OTHER PUBLICATIONS

Kirk-Othmer Encyclopedia Of Chemical Technology, 1980, vol. 1, pp. 386-413.
B. Fischer, C. Thieme, T.M. Fischer, F. Kremer, T. Oge and R. Zentel: "The Packing Of Azobenzene Dye Moieties And Mesogens In The Opto-Dielectric Effect"; Liquid Crystals, 1997, vol. 22, No. 1; pp. 65-74.
S.C. Clark, S.Johnson and C.E. Hoyle: "Photoinitiated Polymerization of Acrylates Using Functional Maleimides"; Polymer Preprints, American Chemical Society; vol. 2, No. 37, 1996; pp. 348-349.

*Primary Examiner*—Ana L. Woodward
(74) *Attorney, Agent, or Firm*—Deborah M. Altman; Frank P. Mallak

(57) ABSTRACT

Describes a photochromic plastic article, e.g., an ophthalmic photochromic article, such as a lens, in which the article includes (1) a rigid substrate, e.g., polymeric substrate, such as a thermoset or thermoplastic substrate, (2) a photochromic polymeric coating appended to at least one surface of the substrate, the photochromic polymeric coating containing a photochromic amount of at least one photochromic material, e.g., spirooxazine, naphthopyran and/or fulgide, and (3) a dendritic polyester acrylate film coherently appended to the photochromic coating. Describes also the aforedescribed photochromic article having an abrasion-resistant coating affixed to the dendritic polyester acrylate film, e.g., an abrasion-resistant coating comprising an organo silane; and a photochromic article having an antireflective coating affixed to the abrasion-resistant coating.

56 Claims, No Drawings

U.S. PATENT DOCUMENTS

| | | |
|---|---|---|
| 6,065,836 A | 5/2000 | Krishnan et al. ........... 351/163 |
| 6,068,797 A | 5/2000 | Hunt |
| 6,093,777 A | 7/2000 | Sorensen et al. ........... 525/438 |
| 6,107,395 A | 8/2000 | Rosthauser et al. ......... 524/719 |
| 6,150,430 A | 11/2000 | Walters et al. ................ 522/79 |
| 6,175,450 B1 | 1/2001 | Andreani et al. ........... 359/586 |
| 6,187,444 B1 | 2/2001 | Bowles et al. ........... 428/423.1 |
| 6,190,777 B1 | 2/2001 | Asano et al. ............... 428/447 |
| 6,225,404 B1 | 5/2001 | Sorensen et al. .......... 525/54.1 |
| 6,268,055 B1 | 7/2001 | Walters et al. .............. 428/413 |
| 6,328,446 B1 | 12/2001 | Bhalakia et al. ............ 351/163 |
| 6,367,930 B1 | 4/2002 | Santelices et al. .......... 351/177 |
| 6,410,611 B1 | 6/2002 | Sakurai et al. .............. 522/103 |
| 6,432,544 B1 | 8/2002 | Stewart et al. ........... 428/424.2 |
| 6,448,425 B1 | 9/2002 | Gedon et al. ............... 556/413 |
| 6,455,163 B1 | 9/2002 | Okamoto et al. ........... 428/412 |
| 6,506,322 B1 | 1/2003 | Breyne et al. |
| 6,506,488 B1 | 1/2003 | Stewart et al. .............. 428/332 |
| 6,531,076 B2 | 3/2003 | Crano et al. ................ 252/586 |
| 6,547,390 B1 | 4/2003 | Bernheim et al. .......... 351/163 |
| 6,602,603 B2 | 8/2003 | Welch et al. ................ 428/412 |
| 6,639,039 B1 | 10/2003 | Fries et al. |
| 2002/0006505 A1 | 1/2002 | Nishizawa et al. |
| 2002/0076549 A1 | 6/2002 | Welch et al. |
| 2002/0114054 A1 | 8/2002 | Rietjens et al. |
| 2002/0151652 A1 | 10/2002 | Adedeji |
| 2003/0008149 A1 | 1/2003 | Moravec et al. |
| 2003/0165686 A1 | 9/2003 | Blackburn et al. |

FOREIGN PATENT DOCUMENTS

| | | |
|---|---|---|
| JP | 3-35236 | 2/1991 |
| JP | 3-269507 | 12/1991 |
| JP | 7159923 | 6/1995 |
| JP | 11072808 | 3/1999 |
| JP | 2000026725 | 1/2000 |
| WO | WO 94/20581 | 9/1994 |
| WO | WO 96/37573 | 11/1996 |
| WO | WO 97/06944 | 2/1997 |
| WO | WO 97/22894 | 6/1997 |
| WO | WO 00/33111 | 6/2000 |
| WO | WO 00/34410 | 6/2000 |
| WO | WO 00/36048 | 6/2000 |
| WO | WO 00/36049 | 6/2000 |
| WO | WO 00/64975 | 11/2000 |
| WO | WO 00/77070 | 12/2000 |
| WO | WO 01/02449 | 1/2001 |
| WO | WO 01/55269 | 8/2001 |
| WO | WO 01/90268 A1 | 11/2001 |
| WO | WO 02/22700 A2 | 3/2002 |
| WO | WO 02/32982 A1 | 4/2002 |
| WO | WO 02/066541 | 8/2002 |
| WO | WO 02/093235 A | 11/2002 |
| WO | WO 03/058300 A | 7/2003 |
| WO | WO 2004/044626 A1 | 5/2004 |

PHOTOCHROMIC OPTICAL ARTICLE

DESCRIPTION OF THE INVENTION

The present invention relates to photochromic articles comprising a rigid substrate to which is applied a photochromic polymeric coating on which is superposed a transparent polymer comprising a dendritic polyester acrylate. In particular, the present invention relates to rigid transparent substrates, e.g., glass and organic plastic substrates used for optical applications. More particularly, the present invention relates to photochromic articles used for ophthalmic applications, e.g., lenses. Still more particularly, the present invention relates to photochromic articles comprising a transparent polymeric substrate having a transparent photochromic organic polymeric coating appended to at least a portion of at least one surface of the substrate, and a transparent layer comprising a dendritic polyester acrylate superposed on said photochromic coating.

In a particular embodiment, the present invention relates to photochromic articles, such as an ophthalmic plastic lens, on at least a portion of at least one surface of which has been appended sequentially, a first layer of a transparent, desirably optically clear, photochromic polymeric coating and a second layer of a transparent dendritic polyester acrylate. In a further embodiment of the present invention, there is contemplated photochromic articles having a third layer comprising at least one abrasion-resistant coating that is superposed on the second layer. In a still further embodiment, a fourth layer, e.g., an antireflective coating, is superposed on the abrasion-resistant coating. Additional layers may be applied to or below the fourth layer to provide additional functional properties to the photochromic article, e.g., antistatic and/or antiwetting coatings.

Clear ophthalmic articles that provide good imaging qualities, while reducing the transmission of incident light into the eye, are needed for a variety of applications, such as sunglasses, vision correcting ophthalmic lenses, plano lenses and fashion lenses, e.g., non-prescription and prescription lenses, sport masks, face shields, goggles, visors, camera lenses, windows, automotive windshields and aircraft and automotive transparencies, e.g., T-roofs, sidelights and backlights. Responsive to that need, photochromic plastic articles used for optical applications have been given considerable attention. In particular, photochromic ophthalmic plastic lenses have been of interest because of the weight advantage they offer, vis-à-vis, glass lenses.

In addition, embodiments of the present invention can be used in association with plastic films and sheets, optical devices, e.g., optical switches, display devices and memory storage devices, such as those described in U.S. Pat. No. 6,589,452, and security elements, such as optically-readable data media, e.g., those described in U.S. Patent Application 2002/0142248, security elements in the form of threads or strips, as described in U.S. Pat. No. 6,474,695, and security elements in the form of verification marks that can be placed on security documents and articles of manufacture.

Photochromism is a phenomenon involving a reversible change in color of an organic or inorganic material, e.g., a chromene or silver halide salt, or an article comprising such a material, upon exposure to ultraviolet radiation. Sources of radiation that contain ultraviolet rays include, for example, sunlight and the light of a mercury lamp. When the photochromic material is exposed to ultraviolet radiation, it exhibits a change in color, and when the ultraviolet radiation is discontinued, the photochromic material returns to its original color or colorless state. Ophthalmic articles that have photochromic material(s) applied to or incorporated within the article exhibit this reversible change in color and a consequent reversible change in light transmission.

The mechanism believed to be responsible for the reversible change in color, i.e., the change in the absorption spectrum in the electromagnetic spectrum of visible light (400–700 μm), that is characteristic of different types of organic photochromic compounds has been described. See, for example, John C. Crano, "Chromogenic Materials (Photochromic)", Kirk-Othmer Encyclopedia of Chemical Technology, fourth Edition, 1993, pp. 321–332. The mechanism responsible for the reversible change in color for organic photochromic compounds, such as indolino spiropyrans and indolino spirooxazines, is believed to involve an electrocyclic mechanism. When exposed to activating ultraviolet radiation, these organic photochromic compounds transform from a colorless closed ring form into a colored open ring form. In contrast, the electrocyclic mechanism responsible for the reversible change in color of photochromic fulgide compounds is believed to involve a transformation from a colorless open ring form into a colored closed ring form.

Photochromic plastic articles have been prepared by incorporating the photochromic material into the plastic substrate by surface imbibition techniques. In such method, photochromic dyes are incorporated into the subsurface region of a plastic article, such as a lens, by first applying one or more photochromic dyes/compounds to the surface of the plastic article, either as the neat photochromic dye/compound or dissolved in a polymeric or other organic solvent carrier, and then applying heat to the coated surface to cause the photochromic dye/compound(s) to diffuse into the subsurface region of the plastic article (a process commonly referred to as "imbibition"). The plastic substrates of such photochromic plastic articles are reported to have sufficient free volume within the polymer matrix to allow photochromic compounds, such as the aforementioned spirooxazines, spiropyrans and fulgides, to transform from the colorless form into the colored form, and then revert to their original colorless form. There are, however, certain polymer matrices that are reported not to have sufficient free volume to allow the aforedescribed electrocyclic mechanism to occur sufficiently to permit their use as a substrate for imbibed (or internally incorporated) photochromic materials for commercially acceptable photochromic applications. Such substrates include, for example, thermoset polymer matrices, such as those prepared from polyol (allyl carbonate) monomers, notably allyl diglycol carbonate monomers, e.g., diethylene glycol bis(allyl carbonate), and copolymers thereof, the commonly known thermoplastic bisphenol A-based polycarbonates, and highly cross-linked optical polymers.

To allow the use of thermoset polymers, thermoplastic polycarbonates, and highly cross-linked optical polymeric materials as plastic substrates for photochromic articles, it has been proposed to apply organic photochromic coatings to the surface of such plastic substrates. It has also been proposed to apply an abrasion-resistant coating onto the exposed surface of the photochromic coating to protect the surface of the photochromic coating from scratches and other similar cosmetic defects resulting from physical handling, cleaning and other exposure of the photochromic coating to the environment.

In certain circumstances involving ophthalmic plastic lenses having a photochromic polymeric coating and an overlay of an abrasion-resistant coating, it has been observed that when such lenses are severely scratched, cleaning of such a scratched lens with commercially available cleaning solutions containing alcohol, e.g., isopropyl alcohol, may cause imperfections in the photochromic coating. In addition, it is not uncommon to find that during manufacture of such plastic lenses, an abrasion-resistant coating that is applied to the photochromic coating, or an antireflective coating that is applied to the abrasion-resistant coating, fails to pass product requirements, or in the case of ophthalmic lenses does not meet commercially acceptable "cosmetic standards" for ophthalmic lenses. Cosmetic defects in a coated lens can include spots, scratches, inclusions, cracks and crazing. When this occurs, it is economically desirable to remove the defective coating, e.g., by chemical treatment with an aqueous caustic solution, and thereafter to apply a new coating. In the process of chemically removing the unacceptable coating, the underlying coatings, e.g., the photochromic coating, can be damaged, thereby destroying the value of the article, e.g., the lens. As is readily evident to those skilled in the art, sequential application of the abrasion-resistant and the antireflective coatings to the photochromic coating of an ophthalmic lens is one of the last in a series of multiple manufacturing steps, each of which adds value and increases the cost of the lens being produced. To scrap the lens at this near final stage of the production process because an appended coating fails to meet product requirements increases production costs and increases the final cost of the lens product. Avoidance of such product losses is, therefore, economically desirable.

Further, some manufacturers of photochromic ophthalmic lenses desire to place their own proprietary abrasion-resistant and/or antireflective coatings on the photochromic coated lenses that have been prepared by another manufacturer. It is possible for the photochromic coating to become scratched or blemished as a consequence of packaging, shipment, unpacking, cleaning or other physical handling of the lens in preparation for the application of such abrasion-resistant and/or antireflective coatings. Consequently, it is desirable that a lens that is shipped to such manufacturers be resistant to scratches or other cosmetic imperfections that may be caused during packaging, unpacking, shipment, cleaning and/or handling of the photochromic coated lens, i.e., be scratch resistant.

To attenuate some of the foregoing difficulties, it has been proposed to apply a radiation-cured acrylate-based film between the photochromic coating and the abrasion resistant coating, thereby to lessen certain manufacturing problems associated with removing defective abrasion resistant coatings and/or antireflective coatings from the photochromic coating, and to protect a photochromic coating having no abrasion-resistant coating during handling and shipment. The radiation-cured acrylate-based film is described as being (a) scratch resistant, (b) resistant to treatment with dilute aqueous inorganic caustic solutions, and (c) compatible with abrasion-resistant, organo silane-containing coatings. In applying the acrylate-based film to the photochromic coating, a polymerizable acrylic composition containing a photoinitiator is used.

Generally, photoinitiator compounds have an aromatic ring in their structure, which effectively absorbs ultraviolet light. Moreover, they are usually of low molecular weight to improve their solubility in the radiation curable composition, and consequently are relatively volatile when subjected to heat. These features can cause yellowing of the cured composition and produce unpleasant odors respectively when the curable and cured composition containing the photoinitiator is subjected to heat and light during and after curing. Further, it is known that unreacted or decomposed photoinitiators remain in the cured composition after curing, and if the cured composition is contacted with water, unreacted photoinitiator is exuded.

It is therefore desirable to utilize a radiation-curable coating composition that does not require a photoinitiator for curing, or requires lower amounts of a photoinitiator than are generally used in radiation-curable coating compositions. It has now been discovered that coatings/films comprising dendritic polyester acrylate can be cured by radiation without use of a photoinitiator, or can be cured by radiation using only small amounts of photoinitiator; and that such a coating/film, when placed between the photochromic polymeric coating and the abrasion-resistant coating, can substantially attenuate the manufacturing problems described above. The dendritic polyester acrylate coating/film adheres to the photochromic coating, is typically harder than the photochromic coating, and is compatible with abrasion-resistant coatings comprising an organo silane material; namely, the applied abrasion-resistant coating does not craze, i.e., exhibit fine cracks.

In accordance with an embodiment of the present invention, there is contemplated a photochromic article, e.g., a lens, comprising, in combination:

(a) a rigid transparent substrate;
(b) a photochromic organic polymeric coating appended to at least a portion of at least one surface of said polymeric substrate, said polymeric coating comprising at least one organic photochromic material; and
(c) a cured transparent film comprising dendritic polyester acrylate appended coherently to said photochromic polymeric coating.

In another embodiment of the present invention, there is contemplated the above-described photochromic article further comprising an abrasion-resistant coating, such as a hard coating comprising an organo silane, appended to the exposed surface of the cured dendritic polyester acrylate film. In a further embodiment of the present invention, there is contemplated a photochromic article that has an antireflective coating applied to the abrasion-resistant coating. Other coatings, such as antistatic and/or antiwetting coatings can also be applied to the antireflective coating.

In a still further embodiment of the present invention, there is contemplated an ophthalmic photochromic article comprising, in combination:

(a) a transparent organic plastic substrate, such as a thermoset substrate prepared from a polymerizable composition comprising an allyl diglycol carbonate, e.g., diethylene glycol bis(allyl carbonate), a substrate prepared from thermoplastic polycarbonate, a substrate prepared from a polyurea urethane, or a substrate prepared from compositions comprising the reaction product of polyfunctional isocyanate(s) and/or isothiocyanate(s) with polythiol(s) or polyepisulfide monomer(s);
(b) an optically clear photochromic organic polymeric coating, such as an acrylic-based, polyurethane-based, polyurea urethane-based, aminoplast resin-based or polyepoxy-based photochromic coating, appended to at least one surface of said plastic substrate, said polymeric coating comprising a photochromic amount of at least one organic photochromic material;
(c) optically clear, radiation-cured layer, e.g., film, comprising dendritic polyester acrylate adhered coherently to said photochromic coating; and
(d) optionally an abrasion resistant coating, such as a hard coating comprising an organo silane adhered to said dendritic polyester acrylate layer. In yet a further contemplated embodiment, an antireflective coating is adhered to said abrasion-resistant coating, assuming that the abrasion-resistant coating is present.

DETAILED DESCRIPTION OF THE INVENTION

In accordance with the present invention, there are provided photochromic articles comprising, in combination, a rigid substrate, e.g., a transparent substrate such as glass or an organic polymeric material; a photochromic polymeric coating affixed to at least a portion of at least one surface of the substrate; and a layer, e.g., coating/film, comprising dendritic polyester acrylate superposed on, e.g., adhered to, the photochromic coating. The dendritic polyester acrylate film is typically (a) harder than the photochromic coating, e.g., it is less likely to be penetrated, marred or scratched than the photochromic coating when subjected to rubbing or scraping, and desirably (b) compatible with abrasion-resistant, organo silane-containing coatings.

For purposes of this specification (other than in the operating examples), unless otherwise indicated, all numbers expressing quantities and ranges of ingredients, reaction conditions, etc., such as those expressing refractive indices and wavelengths, are to be understood as modified in all instances by the term "about". Accordingly, unless indicated to the contrary, the numerical parameters set forth in this specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

As used herein, the term "cure", "cured" or similar terms, as used in connection with a cured or curable composition, e.g., a "cured composition" of some specific description, is intended to mean that at least a portion of the polymerizable and/or crosslinkable components that form the curable composition is at least partially polymerized and/or crosslinked. In certain embodiments, the crosslink density of the crosslinkable components, e.g., the degree of crosslinking, can range from 5% to 100% of complete crosslinking. In other embodiments, the crosslink density can range from 35% to 85%, e.g., 50% to 85%, of full crosslinking. The degree of crosslinking can range between any combination of the previously stated values, inclusive of the recited values.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The specific citation in this specification of patent applications, published or granted patents and published articles, such as the disclosures in identified patents that are referred to by column and line number, which describe relevant methods for preparing monomers, polymerizates, coatings, articles of manufacture, photochromic compounds, etc. are incorporated herein, in toto, by reference.

In accordance with an embodiment of the present invention, a layer, e.g., film, comprising cured dendritic polyester acrylate is superposed on, e.g., adhered coherently to, the photochromic polymeric coating. Non-acrylated dendritic polyester-type macromolecules are described in U.S. Pat. Nos. 5,418,301, 5,663,247, 6,225,404 B1, and U.S. 2002/0151652 A1, among others. These macromolecules are typically three-dimensional molecules having a treelike structure. As used herein, the terms "dendritic polyester-type macromolecules" and "dendritic polyester-type oligomers" (or terms of like import) are intended to mean and include hyperbranched dendritic macromolecules and dendrimers. Dendrimers are highly symmetric, while similar macromolecules designated as hyperbranched may to a certain degree hold an asymmetry, yet maintaining a highly branched treelike structure. Dendrimers can be said to be monodisperse or substantially monodisperse hyperbranched dendritic macromolecules.

Hyperbranched dendritic polyester macromolecules normally comprise an initiator or nucleus having one or more reactive sites or functions and a number of branching layers and optionally one or more spacing layers and/or a layer of chain terminating molecules. Continued replication of branching layers normally yields increase branch multiplicity and, where applicable or desired, increased number of terminal functions. The layers are usually called generations and the branches dendrons. Hyperbranched dendritic macromolecules (dendrimers) can be illustrated by the formulae found in column 6, lines 8 to 30 of U.S. Pat. No. 6,225,404 B1. In those formulae, X and Y are initiators or nuclei having four and two reactive functions, respectively, and A, B and C are branching chain extenders having three (A and C) and four (B) reactive functions, each branching chain extender forming one branching generation in the macromolecule. T in the aforementioned formulae is a terminating chain stopper or a suitable terminal function or site, such as hydroxyl, carboxyl or epoxide groups.

A dendron can be pre-produced and then added to a nucleus. A dendron can be produced by for instance condensing one or more hydroxy functional carboxylic acids at normal esterification temperatures, by allowing mono, di, tri or polyfunctional carboxylic acids to form ester links with mono, di, tri or polyfunctional alcohols or epoxides, or by similar procedures resulting in ester links, ether links or other chemical bonds. The raw materials used to produce a dendron are chosen to provide at least one terminal reactive site to be reacted with a nucleus or initiator.

Dendritic polyester-type macromolecules are typically built up from ester or polyester units optionally in combination with ether or polyether units. The hyperbranched dendritic macromolecule comprises a monomeric or polymeric nucleus having at least one reactive epoxide, hydroxyl, carboxyl or anhydride group, to which nucleus are added 1 to 100, usually 1 to 20, e.g., 2 to 8, branching generations comprising at least one monomeric or polymeric branching chain extender having at least three reactive groups, of which at least one is a hydroxyl group and at least one is a carboxyl or anhydride group, and optionally at least one spacing generation comprising at least one chain extender. The spacing chain extender is desirably a compound having two reactive groups, one being the hydroxyl group and one being a carboxyl or anhydride group, or is an inner ether, such as a lactone, of such a compound. The terminal chain extender functions of the hyperbranched dendritic macromolecule are substantially hydroxyl, carboxyl or anhydride groups and the hyperbranched dendritic macromolecule is optionally completely or partly chain terminated by at least one monomeric or polymeric chain stopper and/or is functionalized.

Dendritic polyester-type macromolecules are well defined, highly branched macromolecules that radiate from a central core and, as discussed, are synthesized through a stepwise repetitive branching reaction sequence. The repetitive branching sequence typically guarantees complete shells for each generation, leading to macromolecules that are typically monodisperse. The synthetic procedures for dendritic polyester macromolecule preparation often provide nearly complete control over the size, shape, surface/interior chemistry, flexibility and topology. The dendritic polyester macromolecule can have complete and symmetrical branches as well as incomplete and asymmetric branches.

Non-limiting examples of central initiator molecules for polyester-type dendritic macromolecules include aliphatic, cycloaliphatic or aromatic diols, triols, tetraols, sorbitol, mannitol, dipentaerythritol, a reaction product of a di-, tri- or polyalcohol and an alkylene oxide, e.g., ethylene oxide, propylene oxide and butylene oxide, having a molecular weight less than 2000. Non-limiting examples of suitable diols include 1,3-propanediol, a dimer, trimer or polymer of 1,3-propanediol, a 2-alkyl-1,3-propanediol, a 2,2-dialkyl-1,3-propanediol, such as 2-butyl-2-ethyl-1,3-propanediol, a 2-hydroxy-2-alkyl-1,3-propanediol, a 2,2-di(hydroxyalkyl)-1,3-propanediol, a 2-hydroxyalkoxy-2-alkyl-1,3-propanediol, a 2,2-di(hydroxyalkoxy)-1,3-propandiol, 1,2-propanediol, 1,3-butanediol, 1,2-ethanediol, 1,4-butanediol, 1,5-pentanediol, neopentyl glycol, trimethylolethane, trimethylolpropane, pentaerythritol, ditrimethylolethane, ditrimethylolpropane, 1,6-hexandiol and polytetrahydrofuran. The alkyl groups of the initiator molecules are typically $C_1$ to $C_{12}$, e.g., $C_1$ to $C_4$, alkyl groups.

Polyester chain extenders are monofunctional carboxylic acids having at least two hydroxyl groups such as, but not limited to, dimethylolpropionic acid, α,α-bis(hydroxy) propionic acid, α,α-bis(hydroxymethyl) propionic acid, α,α-bis(hydroxymethyl) butyric acid, α,α-bis(hydroxymethyl) valeric acid, α,α,α-tris(hydroxymethyl) acetic acid, α,α-bis(hydroxymethyl) butyric acid, α,β-dihydroxy propionic acid, heptonic acid, citric acid, d- or l-tartaric acid or α-phenylcarboxylic acids, such as 3,5-dihydroxybenzoic acid.

The chain terminating agents, which can be used, include saturated monofunctional carboxylic acids, saturated fatty acids, unsaturated monofunctional carboxylic acids, aromatic monofunctional carboxylic acids, such as benzoic acid, and difunctional or polyfunctional carboxylic acids or anhydrides thereof. An example of such acid is behenic acid. Terminal hydroxyl groups in the polyester chain extender can be reacted with chain stoppers with or without functional groups.

Dendritic polyester-type macromolecules are commercially available from Perstorp Specialty Chemicals, Perstorp, Sweden under the designation BOLTORN® H20, H30, and H40 dendritic macromolecules, which macromolecules are functionalized with hydroxy groups at the periphery. These materials have a weight average molecular weight in the range of 1,000 to 4000. The BOLTORN® H20, H30 and H40 materials have on average 16, 32 and 64 hydroxy groups respectively at the periphery of the macromolecule.

Dendritic polyester macromolecule materials can be acrylated by known esterification techniques to provide material used to form the dendritic polyester acrylate film described herein. See, for example, the disclosures in International Patent Publications WO 00/77070 A2 and WO 00/64975.

Acrylation, recovery and purification of the acrylated dendritic polyester macromolecule can be suitably performed using methods well known from the literature, as for instance disclosed in Kirk-Othmer Encyclopedia of Chemical Technology-1980 Vol. 1, pages 386–413, "Acrylic Ester Polymers". Acrylation is typically a direct reaction, such as esterification, with acrylic acid, methacrylic acid, crotonic acid (β-methacrylic acid) and/or a direct reaction with an anhydride and/or a halide corresponding to said acrylic acid, usually at a molar ratio of hydroxyl groups to said acid, anhydride and/or halide of between 1:0.1 and 1:5, more usually between 1:0.5 and 1:1.5. Typically, the acrylating agent is used in stoichiometric molar excess. Other acrylating agents include, for example, epoxide or anhydride functional acrylates and methacrylates, such as glycidylmethacrylate.

The acrylated dendritic polyester macromolecule can have a variable percentage of functional acrylic acid groups, e.g., hydroxyl groups that that have been acrylated. Such percentage can vary from 5 to 100%, based on the initial hydroxyl content. Often, the percentage will vary from 20 to 90%, e.g., 40 to 85%, such as from 45 to 80%. The percentage of acrylated hydroxyl groups can range between any combination of these percentages, inclusive of the recited percentages.

The esterification step is typically performed in the presence of a solvent, such as an apolar organic solvent, examples of which include, but are not limited to, heptane, cyclohexane, toluene, benzene, xylene or mixtures of such solvents. The esterification is conveniently performed in the presence of a catalyst, such as p-toluene sulfonic acid, methane sulfonic acid, trifluoromethane sulfonic acid, trifluoroacetic acid, sulfuric acid, phosphoric acid, naphthalene sulfonic acid, Lewis acids such as $BF_3$, $AlCl_3$, $SnCl_4$, titanates such as tetrabutyl titanates, and organotin compounds. The acrylation step typically is performed at temperatures of from 50 to 200° C., more usually from 80 to 150° C., depending upon the selected solvent and the pressure at which the acrylation step is performed. The acrylation step can be performed in the presence of a radical polymerization inhibitor, such as methyl ether hydroquinone, hydroquinone, phenothiazine, di-t-butyl hydroquinone, or a mixture of such inhibitors.

In accordance with the disclosure of International Patent Publication WO 00/64975, the dendritic polyester macromolecule can be mixed with an organic alcohol, e.g., an aliphatic alcohol, having one or more hydroxyl groups and a molecular weight of less than 2000, e.g., 60 to 1500 or 100 to 1000, prior to the acrylation step because dendritic polyester macromolecules are generally viscous liquids. Typically, the alcohol is a liquid at temperatures of from 20 to 50° C. or yields liquid mixtures with said dendritic polyester macromolecule at said temperature. The alcohol can be a diol, such as ethylene glycol, a 1,2- or 1,3-propylene glycol, a butanediol or a di-, tri- or polyglycol, as for example a diethylene glycol, a polypropylene glycol or a glycol polymer, such as a polymer comprising one or more ethylene glycols and one or more propylene glycols. The dendritic polyester macromolecule and alcohol can be mixed in a weight ratio of dendritic polyester to alcohol of between 90:10 and 10:90, such as between 25:75 and 75:25 or between 40:60 and 60:40, e.g., 50:50. Acrylation of the mixture produces an acrylate composition comprising at least one dendritic polyester acrylate and at least one acrylate monomer. The weight ratio of the dendritic polyester macromolecule and alcohol can vary between any combination of the recited values, inclusive of the specified values.

As used in the present disclosure and claims, the term "dendritic polyester acrylate" (or a term of like import) is intended to mean and include the composition produced by acrylating a dendritic polyester-type macromolecule or by acrylating a dendritic polyester-type macromolecule containing a viscosity reducing material having a group that is acrylated during the acrylation step, e.g., one or more alcohols having one or more hydroxyl groups. The term "dendritic polyester acrylate film" (or a term of like import) is intended to mean and include the film produced by radiation curing of a composition comprising a dendritic polyester acrylate (as defined above) and a composition comprising a dendritic polyester acrylate and at least one other radiation or thermally curable acrylic material, e.g., a composition of a mixture of dendritic polyester acrylate (as defined above) and radiation or thermally curable (meth) acrylic monomer(s) (hereinafter referred to collectively as radiation curable material). The term "composition comprising a dendritic polyester acrylate" (or terms of like import) is intended to mean and include either of such compositions. It is also contemplated that a blend of different dendritic polyester acrylates can be used in the compositions used to prepare the dendritic polyester acrylate film.

Non-limiting examples of radiation curable (meth)acrylic monomer material(s) that can be incorporated into the dendritic polyester acrylate composition include monoacrylates, and polyacrylates such as diacrylates, triacrylates, tetraacrylates, pentaacrylates, etc. Typically diacrylates, triacrylates and mixtures of such acrylates are contemplated. The additional (meth)acrylic monomer material(s) can be blended with the dendritic polyester acrylate composition in various ratios, depending on the physical properties of the film that are desired, e.g., viscosity of the blend, the degree of crosslinking, and hardness of the film. Typically the weight ratio of the dendritic polyester acrylate (as defined above) to the additional (meth)acrylate monomer material(s) can vary widely. In particular, the weight ratio can range from 90:10 to 10:90, more particularly, from 70:30 to 30:70, e.g., from 40:60 to 60:40, such as 50:50. The ratio of the dendritic polyester acrylate to the additional (meth)acrylate monomer material can vary between any combination of the recited values inclusive of the specified values.

As used herein, the terms "acrylic" and "acrylate" are used interchangeably (unless to do so would alter the intended meaning) and include derivatives of acrylic acids, as well as substituted acrylic acids such as methacrylic acid, ethacrylic acid, etc., unless clearly indicated otherwise. The terms "(meth)acrylic" or "(meth)acrylate" are intended to cover both the acrylic/acrylate and methacrylic/methacrylate forms of the indicated material, e.g., monomer. Since in one contemplated embodiment, the dendritic polyester acrylate film is interposed between and adjacent to the photochromic coating and the abrasion-resistant coating, it serves to tie together these coatings and serves as a barrier to protect the photochromic coating. In such an embodiment, the dendritic polyester acrylate film can be referred to as a "tie layer".

Non-limiting examples of acrylic monomers include polyacrylates, e.g., di-, tri-, tetra-, and penta-functional acrylates, and monoacrylates, e.g., a monomer containing a single acrylic functionality, hydroxy-substituted monoacrylates and alkoxysilyl alkylacrylates, such as trialkoxysilyl-propylmethacrylate.

Many acrylates can be represented by the following general formula I,

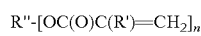

wherein R" is an aliphatic or aromatic group containing from 2 to 20 carbon atoms and optionally from 1 to 20 alkyleneoxy linkages; R' is hydrogen or an alkyl group containing from 1 to 4 carbon atoms, and n is an integer of 1 to 5. When n is greater than 1, R" is a linking group that links the acrylic functional groups together. Typically, R' is hydrogen or methyl, and n is an integer of from 1 to 3. More specifically, diacrylates (when n is 2) may be represented by general formula II,

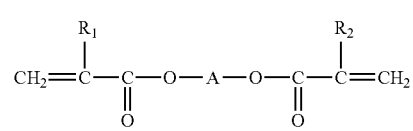

wherein $R_1$ and $R_2$ may be the same or different and are each selected from hydrogen or alkyl groups containing from 1 to 4 carbon atoms, e.g., methyl, and A is a hydrocarbyl linking group of, for example, from 1 to 20 carbon atoms, e.g., an alkylene group, one or more oxyalkylene group(s) [or mixture of different oxyalkylene groups]; or a group of the following general formula III,

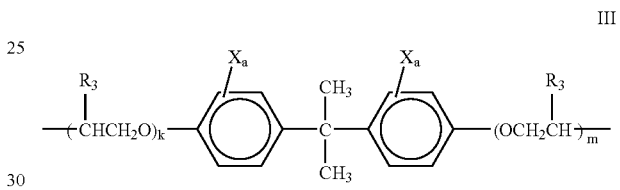

wherein each $R_3$ is a hydrogen atom or an alkyl group of from 1 to 4 carbon atoms, e.g., methyl; X is a halogen atom, e.g., chlorine; a is an integer of from 0 to 4, e.g., 0 to 1, representing the number of halogen atoms substituted on the benzene ring; and k and m are numbers of from 0 to 20, e.g., 1 to 15, or 2 to 10. The values of k and m are average numbers and when calculated may be a whole number or a fractional number.

Acrylates having an epoxy group can be represented by the following general formula IV,

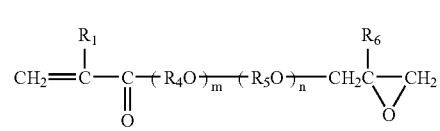

wherein $R_1$ and $R_6$ can be the same or different and are each chosen from hydrogen or an alkyl group of from 1 to 4 carbon atoms, e.g., methyl; $R_4$ and $R_5$ are alkylene groups containing from 2 to 3 carbon atoms, e.g., ethyleneoxy and propyleneoxy, and m and n are numbers of from 0 to 20, e.g., 0 or 1 to 15 or 2 to 10. When one of m and n is 0 and the other is 1, the remaining R group can be an aromatic group of the following formula V,

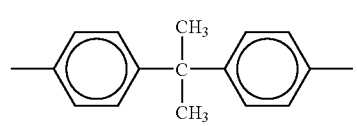

e.g., a group derived from the 2,2'-diphenylenepropane radical, which phenyl groups may be substituted with $C_1$ to $C_4$ alkyl groups or halogens, e.g., methyl and/or chlorine.

In the following detailed examples of identified acrylic monomer materials, the term "acrylate" is intended to mean and include the corresponding alkyl acrylates containing from 1 to 4 carbon atoms in the alkyl group, particularly the corresponding methacrylate; and where the alkyl acrylate, e.g., methacrylate, is identified, the corresponding acrylate is contemplated. For example, reference to hydroxyethyl acrylate in the examples includes hydroxyethyl methacrylate, hydroxyethyl ethacrylate, etc.; and reference to ethylene glycol diacrylate includes, for example, ethylene glycol dimethacrylate, ethylene glycol diethacrylate, etc. Non-limiting examples of such acrylic monomer materials include:
Hydroxyethyl acrylate,
Hydroxypropyl acrylate,
Hydroxybutyl acrylate,
Hydroxy-poly(alkyleneoxy)alkyl acrylate,
Caprolactone acrylate,
Ethylene glycol diacrylate,
Butanediol diacrylate,
Hexanediol diacrylate,
Hexamethylene diacrylate,
Diethylene glycol diacrylate,
Triethylene glycol diacrylate,
Tetraethylene glycol diacrylate,
Polyethylene glycol diacrylate,
Dipropylene glycol diacrylate,
Tripropylene glycol diacrylate,
Tetrapropylene glycol diacrylate,
Polypropylene glycol diacrylate,
Glyceryl ethoxylate diacrylate,
Glyceryl propoxylate diacrylate,
Trimethylolpropane triacrylate
Trimethylolpropane ethoxylate triacrylate,
Trimethylolpropane propoxylate triacrylate,
Neopentyl glycol diacrylate,
Neopentyl glycol ethoxylate diacrylate,
Neopentyl glycol propoxylate diacrylate,
Monomethoxy trimethylolpropane ethoxylate diacrylate,
Pentaerythritol ethoxylate tetraacrylate,
Pentaerythritol propoxylate tetraacrylate,
Dipentaerythritol pentaacrylate,
Dipentaerythritol ethoxylate pentaacrylate,
Dipentaerythritol propoxylate pentaacrylate,
Di-trimethylolpropane ethoxylate tetraacrylate,
Bisphenol A ethoxylate diacrylate containing from 2 to 20 ethoxy groups,
Bisphenol A propoxylate diacrylate containing from 2 to 20 propoxy groups,
Bisphenol A alkoxylated diacrylate containing a mixture of from 2 to 20 ethoxy and propoxy groups,
Bisphenol A glycerolate dimethacrylate,
Bisphenol A glycerolate (1 glycerol/1 phenol) dimethacrylate,
Glycidyl acrylate,
β-methylglycidyl acrylate,
Bisphenol A-monoglycidyl ether acrylate,
4-glycidyloxybutyl methacrylate,
3-(glycidyl-2-oxyethoxy)-2-hydroxypropyl methacrylate,
3-(glycidyloxy-1-isopropyloxy)-2-hydroxypropyl acrylate,
3-(glycidyloxy-2-hydroxypropyloxy)-2-hydroxypropyl acrylate, and
3-(Trimethoxysilyl)propyl methacrylate.

In a further embodiment of the present invention, it is contemplated that still other reactive monomers/diluents, such as monomers containing a radiation or thermally polymerizable ethylenic or allylic functional group (other than the acrylic functional group) can also be present. Examples of such materials include, but are not limited to, radiation curable vinyl compounds, e.g., vinyl ethers. It is contemplated that these reactive monomers/diluents can be present in amounts of up to 30 or 40 weight percent, e.g., from 0 to 40 weight percent (based on resin solids), such as from 0 to 10 or 20 weight percent of the composition comprising the dendritic polyester acrylate. The amount of reactive monomers/diluents can vary between any of the specified amounts including the recited values.

Compounds having vinyl ether groups that can be used in the radiation-curable dendritic polyester acrylate composition include, but are not limited to, alkyl vinyl ethers having a terminal group substituted with hydrogen, halogen, hydroxyl and amino atoms/groups; a cycloalkyl vinyl ether having a terminal group substituted with hydrogen, halogen, hydroxyl and amino atoms/groups; monovinyl ethers, divinyl ethers and polyvinyl ethers in which a vinyl ether group is connected with an alkylene group; and in which a vinyl ether group is connected with at least one group with and without substituents selected from alkyl, cycloalkyl and aromatic groups, via at least one linkage selected from an ether linkage, a urethane linkage and an ester linkage.

Examples of such compounds include, but are not limited to, methyl vinyl ether, hydroxymethyl vinyl ether, chloromethyl vinyl ether, ethyl vinyl ether, 2-hydroxyethyl vinyl ether, 2-chloroethyl vinyl ether, diethyl aminoethyl vinyl ether, propyl vinyl ether, 3-hydroxypropyl vinyl ether, 2-hydroxypropyl vinyl ether, 3-chloropropyl vinyl ether, 3-aminopropyl vinylether, isopropyl vinyl ether, butyl vinyl ether, 4-hydroxybutyl vinyl ether, isobutyl vinyl ether, 4-aminobutyl vinyl ether, pentyl vinyl ether, isopentyl vinyl ether, hexyl vinyl ether, 1,6-hexanediol monovinyl ether, heptyl vinyl ether, 2-ethylhexyl vinyl ether, octyl vinyl ether, isooctyl vinyl ether, nonyl vinyl ether, isononyl vinyl ether, decyl vinyl ether, isodecyl vinyl ether, dodecyl vinyl ether, isododecyl vinylether, tridecyl vinyl ether, isotridecyl vinyl ether, pentadecyl vinyl ether, isopentadecyl vinyl ether, hexadecyl vinyl ether, octadecyl vinyl ether, methylene glycol divinyl ether, ethylene glycol divinyl ether, propylene glycol divinyl ether, 1,4-butanediol divinyl ether, 1,6-hexanediol divinyl ether, cyclohexanediol divinyl ether, trimethylolpropane trivinyl ether, and pentaerythritol tetravinyl ether.

Cycloalkyl vinyl ethers include, but are not limited to, cyclopropyl vinyl ether, 2-hydroxycyclopropyl vinyl ether, 2-chlorocyclopropyl vinyl ether, cyclopropylmethyl vinyl ether, cyclobutyl vinyl ether, 3-hydroxycyclobutyl vinyl ether, 3-chlorocyclobutyl vinyl ether, cyclobutylmethyl vinyl ether, cyclopentyl vinyl ether, 3-hydroxycyclopentyl vinyl ether, 3-chlorocyclopentyl vinyl ether, cyclopentylmethyl vinyl ether, cyclohexyl vinyl ether, 4-hydroxycyclohexyl vinyl ether, cyclohexylmethyl vinyl ether, 4-aminocyclohexyl vinyl ether, cyclohexanediol monovinyl ether, cyclohexanedimethanol monovinyl ether, and cyclohexanedimethanol divinyl ether.

Other non-limiting examples of vinyl ethers that can be used include ethylene glycol methyl vinyl ether, diethylene glycol monovinyl ether, diethylene glycol methylvinyl ether, diethylene glycol divinyl ether, triethylene glycol monovinyl ether, etc. See, for example, the vinyl ethers specified in column 19, line 26 through column 20, line 27 of U.S. Pat. No. 6,410,611 B1.

The aforedescribed amounts of additional acrylate monomers, and other reactive monomers/diluents are based on the total quantity of polymerizable materials (resin solids) comprising the curable dendritic polyester acrylate-containing film composition, not including other components, such as non-polymerizable organic diluents, e.g., solvents, photoinitiators, stabilizers, plasticizers and other such components. The total of all of the various polymerizable materials comprising the curable film composition will, of course, equal 100 percent.

Radiation curable (meth)acrylic materials are typically commercially available; and, if not commercially available, can be prepared by procedures well known to those skilled in the art. Examples of commercial acrylate materials can be found in U.S. Pat. No. 5,910,375, particularly in the disclosure found in column 8, lines 20–55, and in column 10, lines 5–36. Commercially available acrylate materials are available from various manufacturers and include those sold under the trade names, SARTOMER, EBECRYL, and PHOTOMER.

As disclosed in copending U.S. patent application Ser. No. 10/793,241 filed on even date hereof by W. Blackburn et al and titled "Photochromic Optical Article", it is contemplated that an adhesion-enhancing amount of at least one adhesion promoting material (adhesion promoter) can be incorporated into the composition comprising the dendritic polyester acrylate. By adhesion-enhancing amount is meant that the compatibility of the dendritic polyester acrylate film to a superimposed organo silane-containing abrasion-resistant coating (as described herein) applied to the dendritic polyester acrylate film is enhanced. Typically, from 0.1 to 20 weight percent of at least one adhesion promoter(s) is incorporated into the dendritic polyester acrylate composition prior to applying it onto the photochromic coating. More particularly, from 0.5 to 16, e.g., 0.5 to 10, weight percent, more particularly 0.5 to 8, e.g., 5, weight percent, of at least one adhesion promoter is incorporated into the dendritic polyester acrylate composition. The amount of adhesion promoter incorporated into the dendritic polyester acrylate composition can range between any combination of the aforesaid values, inclusive of the recited values.

Among the adhesion promoter materials that can be incorporated into the dendritic polyester acrylate film to enhance its compatibility with an abrasion-resistant coating, e.g., an abrasion-resistant coating comprising-organo-silane material, include, but are not limited to, adhesion promoting organo-silane materials, such as aminoorganosilanes, and silane coupling agents, organic titanate coupling agents and organic zirconate coupling agents.

Aminoorganosilanes that can be used are primary, secondary and tertiary aminoorganosilanes, particularly aminoorganosilanes represented by the following general formula VI:

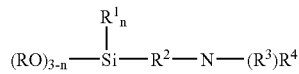

VI wherein n is an integer of from 0 to 2, usually 0 or 1; each R is independently chosen from $C_1$–$C_8$ alkyl, usually $C_1$–$C_4$ alkyl, such as methyl, ethyl, propyl and butyl, a $C_1$–$C_4$ alkoxy $C_1$–$C_8$ alkyl, typically $C_1$–$C_3$ alkoxy $C_1$–$C_3$ alkyl, such as methoxymethyl, methoxyethyl, ethoxymethyl, etc., or $C_6$–$C_{10}$ aryl, e.g., $C_6$–$C_8$ aryl; R' is hydrogen, a $C_1$–$C_8$ alkyl, usually $C_1$–$C_3$ alkyl, or $C_6$–$C_{10}$ aryl, e.g., $C_6$–$C_8$ aryl; R is a divalent $C_1$–$C_{10}$ alkylene, $C_2$–$C_{10}$ alkenylene or phenylene, usually a $C_2$–$C_5$ alkylene, such as ethylene, trimethylene, etc., or $C_2$–$C_5$ alkenylene, such as vinylene, 1-propenylene, butenylene, 2-pentenylene, etc.; each $R^3$ and $R^4$ are independently chosen from hydrogen, $C_1$–$C_8$ alkyl, usually $C_1$–$C_3$ alkyl, $C_1$–$C_8$ hydroxyalkyl, usually $C_2$–$C_3$ hydroxyalkyl, $C_1$–$C_8$ aminoalkyl, usually $C_2$–$C_3$ aminoalkyl, $C_4$–$C_7$ cycloalkyl, e.g., $C_5$–$C_6$ cycloalkyl, $C_6$–$C_{10}$ aryl, e.g., $C_6$–$C_8$ aryl, (meth)acrylyloxy $C_1$–$C_4$ alkyl (the alkyl group being optionally substituted with a functional group such as hydroxy), e.g., (meth)acrylyloxy-2-hydroxypropyl, or $R^3$ and $R^4$ combine to form a cycloalkyl group of from 4 to 7 carbon atoms, e.g., 5 to 6 carbon atoms, or a $C_4$–$C_7$ heterocyclic group wherein the hetero atom(s) are oxygen and/or nitrogen, e.g., morpholino and piperazino, or are a group represented by the general formula VIA

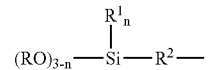

VIA wherein R, $R^1$, $R^2$ and n are as defined with respect to general formula VI. Also included in the compounds of formula VI are the partial and total hydrolysates of compounds represented by that formula.

Non-limiting examples of aminosilanes that can be used include aminopropyl trimethoxysilane, aminopropyl triethoxysilane, aminoethyl trimethoxysilane, aminoethyl triethoxysilane, methylaminopropyl trimethoxysilane, aminobutylmethyl dimethoxysilane, aminopropyldimethyl methoxysilane, aminopropylmethyl dimethoxysilane, aminopropyldimethyl ethoxysilane, aminobutylmethyl dimethoxysilane, bis-(gamma-trimethoxysilylpropyl) amine, N-(3-methacryloxy-2-hydroxypropyl)-3-aminopropyl triethoxysilane, N-(3-acryloxy-2-hydroxypropyl)-3-aminopropyl triethoxysilane, (N,N-dimethylaminopropyl) trimethoxysilane, (N,N-diethyl-3-aminopropyl) trimethoxysilane, diethylaminomethyl triethoxysilane, bis(2-hydroxyethyl)-3-aminopropyl triethoxysilane, γ-aminopropyl trimethoxysilane, N-(2'-aminoethyl)-3-aminopropyl trimethoxysilane, N-(2'-aminoethyl)-3-aminopropyl triethoxysilane, N-butyl-3-aminopropyl triethoxysilane, N-octyl-3-aminopropyl trimethoxysilane, N-cyclohexyl-3-aminopropyl triethoxysilane, N-(3'-triethoxysilylpropyl)-piperazine, bis-(3-triethoxysilylpropyl)amine, tris-(3-trimethoxysilylpropyl)amine, N,N-dimethyl-3-aminopropyl triethoxysilane, N-methyl-N-butyl-3-aminopropyl triethoxysilane, N-(3'-aminopropyl)-3-aminopropyl triethoxysilane, N-(3'-triethoxysilylpropyl) morpholine, N-phenyl-gamma-aminopropyl trimethoxysilane, and N-phenyl-gamma-amino-2-methylpropyl trimethoxysilane.

Silane coupling agents can be represented by the following general formula VII:

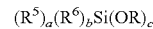

X wherein each $R^5$ is an organofunctional group independently chosen from epoxy, glycidoxy, amino, vinyl, styryl, (meth)acryloxy, mercapto, haloalkyl, e.g., chloroalkyl, ureido, or a hydrocarbon radical having not more than 10 carbon atoms substituted with said organofunctional group; each $R^6$ is a hydrocarbon radical of not more than 20 carbon atoms, that is independently chosen from aliphatic radicals, aromatic radicals or mixtures of such hydrocarbon radicals, e.g., $C_1$–$C_{20}$ alkyl, more particularly, $C_1$–$C_{10}$ alkyl, e.g., $C_1$–$C_6$ alkyl, or phenyl; each R is independently chosen from $C_1$–$C_8$ alkyl, usually $C_1$–$C_4$ alkyl, such as methyl, ethyl, propyl and butyl, a $C_1$–$C_4$ alkoxy $C_1$–$C_8$ alkyl, typically $C_1$–$C_3$ alkoxy $C_1$–$C_3$ alkyl, such as methoxymethyl, methoxyethyl, ethoxymethyl, etc., $C_6$–$C_{10}$ aryl, e.g., $C_6$–$C_8$ aryl or acetyl; a is the integer 1 or 2, usually 1, b is the integer 0, 1 or 2, e.g., 0, and c is the integer 1, 2, or 3, e.g., 2 or 3, provided that the sum of a+b+c equals 4.

Non-limiting examples of silane coupling agents include: vinyl triacetoxysilane, vinyl trimethoxysilane, vinyl tri(2-methoxyethoxy)silane, vinyl triphenoxysilane, vinyl triisopropoxysilane, vinyl tri-t-butoxysilane, divinyl diethoxysilane, gamma glycidoxypropyl trimethoxysilane, beta-(3,4-epoxycyclohexyl)ethyl trimethoxysilane, allyl triethoxysilane, allyl trimethoxysilane, (3-acryloxypropyl) dimethylmethoxysilane, (3-acryloxypropyl) methyldimethoxysilane, (3-acryloxypropyl) trimethoxysilane, (3-methacryloxypropyl) trimethoxysilane, (methacryloxymethyl) dimethyl ethoxysilane, methacryloxymethyl triethoxysilane, methacryloxymethyl trimethoxysilane, methacryloxypropyl dimethyl ethoxysilane, methacryloxypropyl trimethoxysilane, styrylethyl trimethoxysilane, mercaptomethyl methyldiethoxysilane, 3-mercaptopropyl methyldimethoxysilane, 3-mercaptopropyl triethoxysilane, 3-mercaptopropyl trimethoxysilane, 3,4-epoxy cyclohexylethyl trimethoxysilane, dimethyl diethoxysilane, chloropropyl triethoxysilane, 3-(trimethoxysilyl)propyl methacrylate, ureidopropyl triethoxysilane, mixtures of such silane materials, and at least partial hydrolysates of such silanes.

Non-limiting examples of organic titanate coupling agents include: tetra (2,2-diallyloxymethyl)butyl titanate, di(ditridecyl)phosphito titanate (commercially available as KR 55 from Kenrich Petrochemicals, Inc.); neopentyl(diallyl)oxy trineodecanoyl titanate; neopentyl (diallyl)oxy tri (dodecyl)benzene-sulfonyl titanate; neopentyl (diallyl)oxy tri(dioctyl)phosphato titanate; neopentyl (diallyl)oxy tri(dioctyl) pyro-phosphato titanate; neopentyl (diallyl)oxy tri (N-ethylenediamino)ethyl titanate; neopentyl (diallyl)oxy tri(m-amino) phenyl titanate; neopentyl (diallyl)oxy trihydroxy caproyl titanate; isopropyl dimethyacrylisostearoyl titanate; tetraisopropyl (dioctyl) phosphito titanate; mixtures of such titanates, and at least partial hydrolysates thereof.

Non-limiting examples of organic zirconate coupling agents include tetra (2,2-diallyloxymethyl)butyl di(ditridecyl)phosphito zirconate (commercially available as KZ 55 from Kenrich Petrochemicals); neopentyl(diallyloxy) trineodecanoyl zirconate; neopentyl(diallyl)oxy tri(dodecyl)benzene sulfonyl zirconate; neopentyl(diallyloxy) tri(dioctyl) phosphato zirconate; neopentyl (diallyloxy) tri(dioctyl) pyro-phosphato zirconate; neopentyl(diallyloxy) tri(N-ethylenediamino)ethyl zirconate; neopentyl (diallyloxy), tri (m-amino)phenyl zirconate; neopentyl (diallyloxy) trimethacryl zirconate; neopentyl (diallyloxy) triacryl zirconate; dineopentyl(diallyloxy) di(p-amino) benzoyl zirconate; dineopentyl (allyl)oxy di(3-mercapto) propionic zirconate; mixtures of such zirconates, and at least partial hydrolysates thereof.

As used in this description and claims, the term "at least partial hydrolysates" is intended to mean and include compounds that are hydrolyzed partially or hydrolyzed completely.

As described earlier, dendritic polyester acrylates can be cured without the use of photoinitiators. Moreover, it is contemplated that the compositions described herein comprising the dendritic polyester acrylate can also be cured without the use of photoinitiators. However, the use of small amounts of one or more photoinitiators will enhance the cure rate and provide a more complete cure in a shorter amount of time. Accordingly, it is contemplated that the curable dendritic polyester acrylate composition can also contain at least one photoinitiator. A photoinitiator is not required when the resin formulation is to be cured by an electron beam process.

When used, the photoinitiator is present in amounts sufficient to initiate and sustain the curing of the composition, e.g., an initiating or photoinitiating amount. Photoinitiators are desirably used in the least amount necessary to obtain initiation of the curing process. Generally, the photoinitiator(s) can be present in amounts of from 0.1 to 10 weight percent, such as from 0.5 to 6 weight percent, more generally from 1 to 4 weight percent, based on the total weight of the photoinitiated polymerizable components in the curable dendritic polyester acrylate film composition. Photoinitiators are discussed and described subsequently in connection with the photochromic polymer coating. That discussion is applicable here also in connection with the radiation curable dendritic polyester acrylate composition, and is incorporated here. Further examples of commercial photoinitiators can be found in column 10, lines 38–43 of U.S. Pat. No. 5,910,375, and in column 11, lines 24–65 of U.S. Pat. No. 6,271,339 B1.

The dendritic polyester acrylate film forming composition can contain ultraviolet light stabilizers, which may be a UV absorber and/or a hindered amine light stabilizer (HALS). Non-limiting examples of UV absorbers include the benzotriazols and hydroxybenzophenones. Care should be observed, however, in the case of UV absorbers that sufficient UV radiation of the appropriate wavelength is permitted to pass through the maleimide derivative-containing layer to activate the photochromic material(s) within the photochromic polymeric coating. HALS stabilizers are available from Ciba-Geigy under the TINUVIN trade name. The amount of light stabilizer that is used is that amount that is effective to stabilize the composition, i.e., an effective amount, which will depend on the specific compounds chosen, but typically is up to 20 parts by weight relative to 100 parts by weight of the polymerizable resin components. The UV absorber is also used in effective amounts, which is typically up to 10 parts by weight, e.g., 0.05 to 5 parts by weight, relative to 100 parts of the polymerizable resin components.

The dendritic polyester acrylate film forming composition can include other additives known to those skilled in the art. These additives can include, but are not limited to, solvents if required to achieve the appropriate viscosity, flow and leveling additives, wetting agents, antifoaming agents, rheology modifiers, surfactants, e.g., fluorosurfactants, stabilizers and antioxidants. Such materials are well known to those skilled in the art, and examples of some commercial surfactants and antioxidants/stabilizers can be found in column 10, lines 43–54 of the aforementioned '375 patent. Other non-limiting examples of such additives include silicones, modified silicones, silicone acrylates, hydrocarbons, and other fluorine-containing compounds.

The curable dendritic polyester acrylate film forming composition is prepared by mixing the components of the composition at temperatures that facilitate mixing and blending. The composition can then be applied to the photochromic coating by the same procedures that are described subsequently for applying the photochromic coating to the plastic substrate, e.g., spin coating and dip coating.

Prior to applying the dendritic polyester acrylate composition to the photochromic coating, it is common, but not required, to treat the surface of the photochromic coating to enhance adhesion of the dendritic polyester acrylate film to the photochromic coating. Effective treatments include activated gas treatment, such as treatment with a low temperature plasma or corona discharge. A particularly desirable surface treatment is a low temperature plasma treatment. This method allows treatment of the surface to enhance adhesion of a superimposed film or coating, and is a clean and efficient way to alter the physical surface, e.g., by roughening and/or chemically altering the surface without affecting the rest of the article. Inert gases, such as argon, and reactive gases, such as oxygen, have been used as the plasma gas. Inert gases will roughen the surface, while reactive gases such as oxygen will both roughen and chemically alter slightly the surface exposed to the plasma, e.g., by producing hydroxyl or carboxyl units on the surface. Oxygen is used as the plasma gas in one contemplated embodiment because it is considered that it provides a slight, but effective, physical roughening of the surface along with a slight, but effective, chemical modification of the surface. Naturally, the extent of the surface roughening and/or chemical modification will be a function of the plasma gas and the operating conditions of the plasma unit (including the length of time of the treatment).

It is reported that a conventional plasma treatment alters the top 20 to 200 angstroms of the surface (a few molecular layers.) The operating conditions of the plasma unit are a function of the design and size, e.g., volume, of the plasma chamber, power and construction of the plasma unit. The frequency at which the plasma operates can vary, e.g., from a low frequency such as 40 kHz to microwave frequencies such as 2.45 GHz. Similarly, the power at which the plasma unit operates can vary, e.g., from 50 to 1000 Watts, e.g., 50 to 750, such as 50 to 150 Watts. The pressure at which the plasma unit operates can also vary; however, it has been observed that low pressures are generally less destructive physically of the treated surface, which is desired. Low pressures, e.g., from 20 to 65 or 70 Pa are believed to be useful. The time that the surface is exposed to the plasma can also vary and will be a function of the type of surface being treated, i.e., the type of polymer used for the photochromic polymeric coating. However, care should be taken that the surface is not treated for too long since lengthy periods of treatment can be counterproductive. One skilled in the art can readily determine the minimum time required to provide a plasma treated surface that enhances adhesion of the dendritic polyester acrylate film to the photochromic coating. For ophthalmic articles, such as lenses, the length of the plasma treatment will generally vary from 1 to 10 minutes, e.g., 1 to 5 minutes. One contemplated plasma treatment involves use of an oxygen plasma generated by a Plasmatech machine operating at a power level of 100 Watts for from 1 to 10, e.g., 1 to 5 minutes, while introducing 100 ml/minute of oxygen into the vacuum chamber of the Plasmatech machine.

The surface of the coating or article subjected to plasma treatment will typically be at room temperature; however, if desired the surface can be preheated slightly. It should be noted that plasma treatment will tend to increase the temperature of the surface (and article) treated. Consequently, the temperature of the surface during treatment will be a direct function of the length of the plasma treatment. The temperature of the surface to be subjected to a plasma treatment should be maintained at temperatures below that at which the surface is not significantly adversely affected (other than the intended increase in surface area by roughening and slight chemical modification.) One skilled in the art can readily select the operating conditions of the plasma unit, vis-à-vis, the substrate treated, to achieve an improvement in the adhesion of a superimposed film/coating on the plasma treated surface. Examination of the treated surface can be performed by atomic force microscopy to determine the relative extent of the physical change in the surface. Generally, a low temperature, microwave frequency, oxygen plasma can be used for treatment of a photochromic coating to which a radiation-cured dendritic polyester acrylate film is applied.

The curable dendritic polyester acrylate film forming composition is applied in a manner to obtain a substantially homogeneous cured film, the thickness of which can vary. In one contemplated embodiment, the thickness is less than 200 microns, usually less than 100 microns, e.g., not more than 50 microns. In another contemplated embodiment, the film can range in thickness from 2 to 20 microns, e.g., 2 to 15 microns, more typically from 8 to 12 microns. The film thickness may range between any combinations of these values, inclusive of the recited values. The term "film" is generally considered by those skilled in the coating art to be a layer with a thickness of not more than 20 mils (500 microns); however, as used in this disclosure and claims, the term film when used in relation to the radiation-cured, dendritic polyester acrylate film is defined as having a thickness, as herein described.

The applied film is then exposed to UV radiation (or to an Electron Beam process, if UV radiation is not used), i.e., radiation in the range of 200 and 450 nanometers. Typically, this is accomplished by passing the film (or the substrate on which the film is applied) under a commercially available UV or excimer lamp on a conveyer moving at predetermined speeds. The radiation can contain in its spectra both visible and ultraviolet light. The radiation can be monochromatic or polychromatic, incoherent or coherent and should be sufficiently intense to initiate the polymerization. Any appropriate type of UV lamp, e.g., mercury vapor or pulsed xenon, can be used. If a photoinitiator is used, the absorbance spectra of the photoinitiator(s) should be matched with the spectral output of the UV lamp (bulb), e.g., an H bulb, D bulb, Q bulb or V bulb, for the highest curing efficiency. The cure process is generally more efficient when oxygen, e.g., air, is excluded from the cure process. This can be accomplished by using a nitrogen blanket over the applied film during the cure process.

Following the radiation cure, e.g., UV cure, a thermal post cure can be used to cure completely the film. Heating in an oven at 212° F. (100° C.) for from 0.5 to 3 hours is usually adequate to thoroughly cure the film. The discussion respecting radiation curing of the photochromic coating is also applicable here in connection with the cure of the dendritic polyester acrylate film, and accordingly that discussion is incorporated here.

Alternatively, the dendritic polyester acrylate film can be cured thermally, although thermal curing is less desirable. For example, a thermal azo-type or peroxy-type free radical initiator can be incorporated into the film and the film cured by infrared heating or by placing the film (or the substrate containing the film) in a conventional oven, e.g., a convection oven, maintained at temperatures sufficient to cure the film. Examples of such free radical initiators are described herein in relation to the acrylic/methacrylic monomer-based photochromic coating composition, and that discussion is applicable here. In a further contemplated embodiment, the dendritic polyester acrylate film can be cured with a combination of a thermal initiator, as described above, and a photoinitiator. Non-limiting examples of photoinitiators are described herein in relation to the photopolymerization of the photochromic polymeric coating. That discussion is applicable here and is incorporated herein. When thermal curing of the composition comprising the dendritic polyester acrylate is used, either alone or in combination with a photoinitiator, e.g., using radiation curing, one or more of the other reactive monomer materials, e.g., (meth)acrylic monomers, incorporated with the dendritic polyester acrylate will also be thermally curable.

Rigid substrates to which the photochromic polymeric coating are applied can vary and include any rigid substrate that will support a photochromic polymeric coating. Non-limiting examples of such rigid substrates include: paper, glass, ceramics, wood masonry, textiles, metals and organic polymeric materials. The particular substrate used will depend on the particular application that requires both a rigid substrate and a photochromic coating. In a desired embodiment, the rigid substrate is transparent.

Polymeric substrates that can be used in preparing the photochromic articles of the present invention include organic polymeric materials and inorganic materials such as glass. As used herein, the term "glass" is defined as being a polymeric substance, e.g., a polymeric silicate. Glass substrates can be of any type suitable for the intended purpose; but, is desirably a clear, low colored, transparent glass such as the well-known silica type of glass, particularly soda-lime-silica glass. The nature and composition of various silica glasses are well known in the art. The glass can be strengthened by either thermal or chemical tempering. Polymeric organic substrates that can be used to prepare the photochromic articles described herein, are any of the currently known (or later discovered) plastic materials that are chemically compatible with the photochromic polymeric coating applied to the surface of the substrate. Particularly contemplated are the art-recognized synthetic resins that are useful as optical substrates, e.g., organic optical resins that are used to prepare optically clear castings for optical applications, such as ophthalmic lenses.

Non-limiting examples of organic substrates that can be used as polymeric organic substrates are polymers, i.e., homopolymers and copolymers, prepared from monomers and mixtures of monomers disclosed in U.S. Pat. No. 5,962,617 and in U.S. Pat. No. 5,658,501 from column 15, line 28 to column 16, line 17. Such organic substrates can be thermoplastic or thermoset polymeric substrates, e.g., transparent, more particularly optically clear, substrates having a refractive index that desirably ranges from 1.48 to 1.74, e.g., 1.50 to 1.67.

Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc; polyurea-polyurethane (polyurea urethane) polymers, which are prepared, for example, by the reaction of a polyurethane prepolymer and a diamine curing agent, a composition for one such polymer being sold under the trademark TRIVEX by PPG Industries, Inc; polyol (meth)acryloyl terminated carbonate monomers; diethylene glycol dimethacrylate monomer; ethoxylated phenol methacrylate monomers; diisopropenyl benzene monomer; ethoxylated trimethylol propane triacrylate monomers; ethylene glycol bismethacrylate monomer; poly(ethylene glycol) bismethacrylate monomers; urethane acrylate monomers; poly(ethoxylated bisphenol A dimethacrylate) monomers; poly(vinyl acetate); poly(vinyl alcohol); poly (vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanate(s) and/or isothiocyanate(s) with polythiol(s) or polyepisulfide monomers, either homopolymerized or co-and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, e.g., to form interpenetrating network products. The exact chemical nature of the organic substrate is not critical to the present invention. However, the organic polymeric substrate should be chemically compatible with the photochromic polymeric coating applied to the surface of the substrate. For optical applications, the substrate should be transparent, more desirably optically clear.

The polymeric organic substrate used to prepare the photochromic articles of the present invention can have a protective coating, e.g., an abrasion-resistant coating, on its surface. For example, commercially available thermoplastic polycarbonate optical lenses are typically sold with an abrasion-resistant coating, e.g., a hard coat, already applied to its surface(s) because the surface tends to be readily scratched, abraded or scuffed. An example of such a lens is the Gentex polycarbonate lens (available from Gentex Optics) that is sold with a hard coat already applied to the polycarbonate surface. As used in this disclosure and claims, the terms "polymeric organic substrate" (or similar terms) or "surface" of such a substrate, is intended to mean and include either the polymeric organic substrate itself or such a substrate with a coating, e.g., protective coating and/or primer, on the substrate. Thus, when reference is made in this disclosure or claims to applying a primer coating or photochromic polymeric coating to the surface of the substrate, such reference includes applying such a coating to the polymeric organic substrate per se or to a coating, e.g., an abrasion-resistant coating or primer on the surface of the substrate. Hence, the term "substrate" includes substrates having a protective coating and/or primer on its surface. The coating can be any suitable coating (other than a photochromic coating) and is not limited to an abrasion-resistant coating (hard coat), e.g., any protective coating, primer coating or even a coating that provides additional functional properties to the article of which the substrate is a part.

The use of photochromic organic coatings on plastic substrates, particularly plastic substrates such as thermoplastic polycarbonates, has been described. In accordance with the present invention, any organic polymeric material that can be used as a coating with the chosen organic substrate and which will function as a host material for the organic photochromic materials/compounds selected for use can be used. Normally, the host organic polymeric coating has sufficient internal free volume for the photochromic material to function efficiently, e.g., to change from a colorless form to a colored form that is visible to the naked eye in response to ultraviolet (UV) radiation, and to change back to the colorless form when the UV radiation is removed. Otherwise, the precise chemical nature of the organic coating that is used as the host material for the photochromic material(s) is not critical.

Non-limiting examples of such organic polymeric materials include polyurethane-based coatings, such as those described in U.S. Pat. Nos. 6,107,395 and 6,187,444 B1, and International Patent Publication WO 01/55269; epoxy resin-based coatings, such as those described in U.S. Pat. No. 6,268,055 B1; acrylic/methacrylic monomer-based coatings, such as those described in U.S. Pat. No. 6,602,603, International Patent Publications WO 96/37593 and WO 97/06944, and U.S. Pat. Nos. 5,621,017 and 5,776,376; aminoplast, e.g., melamine type, resins, such as those described in U.S. Pat. No. 6,506,488 B1 and 6,432,544 B1; coatings comprising hydroxyl-functional components and polymeric anhydride-functional components, e.g., polyanhydride coatings, such as those described in U.S. Pat. No. 6,436,525 B1; polyurea urethane coatings, such as those described in column 2, line 27 to column 18, line 67 of U.S. Pat. No. 6,531,076 B2; and coatings comprising N-alkoxymethyl(meth)acrylamide functional polymers, such as those described in U.S. Pat. No. 6,060,001.

Of particular interest are photochromic polyurethane-based coatings, photochromic polyacrylic or polymethacrylic-based coatings [referred to collectively as poly(meth)acrylic-based coatings], photochromic aminoplast resin-based coatings, photochromic polyurea urethane-based coatings and photochromic epoxy resin-based coatings. Of special interest are the optically clear photochromic polyurethane, polyurea urethane, epoxy and poly(meth)acrylic-based coatings for use on transparent, e.g., optically clear, plastic substrates for ophthalmic applications, such as piano and vision correcting ophthalmic lenses, sun lenses and goggles, commercial and residential windows, automotive and aircraft transparencies, helmets, plastic sheeting, clear films, etc.

The term "transparent", as used in this disclosure and claims in connection with a substrate, film, material or coating, is intended to mean that the indicated coating, film, substrate or material, such as the plastic substrate, the non-activated photochromic coating, the radiation-cured dendritic polyester acrylate film, and coatings superimposed or superposed on the radiation-cured dendritic polyester acrylate film, have a light transmission of at least 70%, typically at least 80%, and more typically at least 85%. By the term "optically clear", as used in this disclosure and claims, is meant that the specified item has a light transmission that satisfies commercially accepted and regulatory values for optical, e.g., ophthalmic, articles.

Polyurethanes that can be used to prepare a photochromic polyurethane coating are those produced by the reaction of an organic polyol component and an isocyanate component, as more fully described in column 3, line 4 through column 6, line 22 of U.S. Pat. No. 6,187,444 B1. More particularly, the polyurethanes are produced from a combination of at least one hard segment producing organic polyol and at least one soft segment producing organic polyol. Generally, the hard segment results from the reaction of the isocyanate and a chain extender; and the soft segment results from the reaction of the isocyanate with a polymer backbone component such as a polycarbonate polyol, a polyester polyol or a polyether polyol, or mixtures of such polyols. The weight ratio of hard segment producing polyols to soft segment-producing polyols can vary from 10:90 to 90:10.

The relative amounts of the components comprising the polyurethane reaction mixture can be expressed as a ratio of the available number of reactive isocyanate groups to the available number of reactive hydroxyl groups, e.g., a ratio of NCO:OH groups of from 0.3:1.0 to 3.0:1.0. The isocyanate component can be an aliphatic, aromatic, cycloaliphatic or heterocyclic isocyanate, or mixtures of such isocyanates. Typically, the isocyanate component is selected from blocked or unblocked aliphatic or cycloaliphatic isocyanates, or mixtures of such isocyanates.

As further described in U.S. Pat. No. 6,107,395, polyurethanes suitable as a photochromic host material can be prepared from an isocyanate reactive mixture comprising (i) from 40 to 85 weight percent of one or more polyols having a nominal functionality of from 2 to 4 and molecular weights of from 500 to 6000 g/mole, (ii) from 15 to 60 weight percent of one or more diols or triols or mixtures thereof having a functionality of from 2 to 3 and molecular weights of from 62 to 499, and (iii) an aliphatic polyisocyanate having a functionality of less than 3, e.g., 2.

The previously mentioned U.S. Pat. No. 6,602,603 describes reaction mixtures for poly(meth)acrylic host materials for photochromic materials as comprising at least two difunctional (meth)acrylate monomers, which can have from greater than 3 to less than 15 alkoxy units. In one described embodiment, a difunctional (meth)acrylate has the reactive acrylate groups connected by a straight or branched chain alkylene group, which usually contains from 1 to 8 carbon atoms; while a second difunctional (meth)acrylate has the reactive acrylate groups connected by ethylene oxide, propylene oxide, butylene oxide or mixtures of such oxide groups in random or block order.

Epoxy resin-based coatings described in U.S. Pat. No. 6,268,055 B1 are those prepared by the reaction of a composition comprising an epoxy resin or polyepoxide, e.g., polyglycidyl ethers of aliphatic alcohols and phenols, epoxy-containing acrylic polymers, polyglycidyl esters of polycarboxylic acids and mixtures of such epoxy-containing materials, with a curing agent, e.g., a polyacid comprising a half-ester formed from reacting an acid anhydride with an organic polyol.

The amount of photochromic coating applied to at least one surface of the plastic substrate is that amount which provides a sufficient quantity of organic photochromic material to produce a coating that exhibits a desired change in optical density ($\Delta OD$) when the cured coating is exposed to ultraviolet (UV) radiation, i.e., a photochromic amount. Typically, the change in optical density measured at 22° C. (72° F.) after 30 seconds of UV exposure is at least 0.05, more typically at least 0.15, and still more typically at least 0.20. The change in optical density after 15 minutes of UV exposure is typically at least 0.10, more typically at least 0.50, and still more typically at least 0.70.

Stated differently, the amount of active photochromic material used in the photochromic coating can range from 0.5 to 40.0 weight percent, based on the total weight of monomer(s)/resin(s) used to produce the coating. The relative amounts of photochromic material(s) used will vary and depend in part upon the relative intensities of the color of the activated form of the photochromic compound(s), the ultimate color desired, and the solubility or dispersibility of the photochromic material(s) in the polymeric coating. Care should be taken to avoid use of amounts of photochromic material, which cause crystals of the photochromic material(s) to be formed within the coating. Typically, the concentration of active photochromic material(s) within the photochromic coating ranges from 1.0 to 30 weight percent, more typically, from 3 to 20 weight percent, and still more typically, from 3 to 10 weight percent (based on the total weight of monomer(s)/resin(s) used to produce the coating.) The amount of photochromic material in the coating can range between any combination of these values, inclusive of the recited values.

The bleach rate of the photochromic coating, as reported in terms of the fading half-life (T ½), is typically not more than 500 seconds, more typically not more than 190 seconds, and still more typically not more than 115 seconds. The half-life bleach rate is the time interval in seconds for the change in optical density ($\Delta$OD) of the activated form of the photochromic coating to reach one half the highest $\Delta$OD after removal of the source of activating light. The afore-described values for change in optical density and bleach rate are measured at 22° C. (72° F.).

The photochromic coating applied to the surface of the substrate will typically have a thickness of at least 3 microns, more typically at least 5 microns, still more typically, at least 10 microns, e.g., at least 20 or 30 microns. The applied photochromic coating will also usually have a thickness of not more than 200 microns, more usually not more than 100 microns, and most usually not more than 50 microns, e.g., not more than 40 microns. The thickness of the photochromic coating can range between any combinations of these values, inclusive of the recited values. For example, the photochromic coating can range from 10 to 50 microns, e.g., 20 to 40 microns. The applied photochromic coating should most desirably be free of cosmetic defects, such as scratches, pits, spots, cracks, inclusions, etc.

Typically, the term "coating" is considered by those knowledgeable in the coating art to be a layer having a thickness of not more than 4 mils (about 100 microns). However, as used in this specification and claims in relation to the photochromic coating, the term coating is defined herein as having a thickness, such as a thickness defined hereinabove. Further, as used in this specification and claims, it is intended that the term "surface of the polymeric substrate" or like terms, i.e., the surface to which the photochromic polymeric coating is applied, include the embodiment in which only at least a portion of the surface of the substrate is coated. Hence, the photochromic coating (and the dendritic polyester acrylate film applied to the photochromic coating) may cover only a portion of a surface of the substrate, but typically it is applied to the entire surface of at least one substrate surface.

The hardness of the photochromic coating is not critical, but after application and curing, should desirably be sufficiently hard to be physically/mechanically handled without causing blemishes, e.g., scratches, in the coating. The hardness of the photochromic coating typically is less than the film prepared from the radiation-cured dendritic polyester acrylate composition applied to the photochromic coating, which in turn is typically softer than the abrasion-resistant (hard coat) coating applied to the dendritic polyester acrylate film. Thus, the principal coatings applied to the plastic substrate (not including any primer layer that can be applied to the substrate) increase in hardness in the direction of the abrasion-resistant coating. The hardness of coatings or films can be quantified by tests known to those skilled in the art, e.g., Fischer microhardness, pencil hardness or Knoop hardness.

The Fischer microhardness of photochromic polymeric coatings is typically less than 30 Newtons per mm$^2$, more particularly, less than 25, e.g., less than 15, such as 2 or 5, Newtons per mm$^2$. In particular, the Fischer microhardness values will be in the lower portion of the ranges described herein, e.g., from 2 to 25, such as 10 to 15, e.g., 12, Newtons per mm$^2$. The lower range of hardness allows the electrocyclic mechanism discussed previously in relation to photochromic materials to occur with greater efficiency than at higher hardness values. The Fischer microhardness of the photochromic polymeric coatings can range between any combination of the stated values, inclusive of the recited values. Fischer microhardness values can be obtained with a Fischerscope HCV Model H-100 (available from Fischer Technology, Inc.) by taking 3 measurements in the center area of the test sample under conditions of a 100 milliNewton load, 30 load steps, and 0.5 second pauses between load steps at an indentor (Vickers diamond stylus) depth of 2 µm (microns).

Photochromic materials, e.g., photochromic dyes/compounds or compositions containing such dye/compounds, that can be utilized for the photochromic coating applied to the rigid substrate are inorganic and/or organic photochromic compounds and/or substances containing such organic photochromic compounds that are currently known to those skilled in the art (or that are later discovered). The particular photochromic material(s), e.g., compound(s), selected is not critical, and its/their selection will depend on the ultimate application and the color or hue desired for that application. When two or more photochromic compounds are used in combination, they are generally chosen to complement one another to produce a desired color or hue.

Organic photochromic compounds used in the photochromic coating commonly have at least one activated absorption maxima within the visible spectrum of between 300 and 1000, e.g., between 400 and 700, nanometers. The organic photochromic material(s) is incorporated, e.g., dissolved or dispersed, in the photochromic coating, and color when activated, i.e., when exposed to ultraviolet radiation, the photochromic material(s) changes to the color or hue that is characteristic of the colored form of such material(s).

The inorganic photochromic material typically contains crystallites of silver halide, cadmium halide and/or copper halide. Generally, the halide material is the chloride and bromide. Other inorganic photochromic materials can be prepared by the addition of europium (II) and/or cerium (III) to a mineral glass, such as a soda-silica glass. In one embodiment, the inorganic photochromic material(s) are added to molten glass and formed into particles that are incorporated into the coating composition that is used to form the polymeric photochromic coating. Such inorganic photochromic materials are described in the *Kirk Othmer Encyclopedia of Chemical Technology*, 4$^{th}$ Edition, Volume 6, pages 322–325.

In one contemplated embodiment, the organic photochromic component of the photochromic coating comprises:
(a) at least one photochromic organic compound having a visible lambda max of from 400 to less than 550, e.g., from 400 to 525, nanometers; and
(b) at least one photochromic organic compound having a visible lambda max of greater than 525 or 550 nanometers, e.g., from 525 or 550 to 700 nanometers.

Non-limiting examples of photochromic compounds that can be used in the photochromic coating include benzopyrans, chromenes, e.g., naphthopyrans, such as, naphtho[1,2-b]pyrans, and naphtho[2,1-b]pyrans, spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57, and U.S. Pat. No. 5,658,501 at column 1, line 64 to column 13, line 36 Additional non-limiting examples of photochromic compounds that can be used include the oxazines, such as benzoxazines, naphthoxazines, and spiro(indoline)pyridobenzoxazines. Other photochromic substances contemplated for use herein are photochromic metal dithizonates, e.g., mercury dithizonates, which are described in, for example, U.S. Pat. No. 3,361,706; fulgides and fulgimides, e.g. the 3-furyl and 3-thienyl fulgides and fulgimides, which are described in U.S. Pat. No. 4,931,220 at column 20, line 5 through column 21, line 38; diarylethenes, which are described in U.S. Patent application 2003/0174560 from paragraphs [0025] to [0086]; and mixtures of any of the aforementioned photochromic materials/compounds.

Further non-limiting examples of photochromic compounds, polymerizable photochromic compounds and complementary photochromic compounds are described in the following U.S. patents:

U.S. Pat. No. 5,166,345 at column 3, line 36 to column 14, line 3;
U.S. Pat. No. 5,236,958 at column 1, line 45 to column 6, line 65;
U.S. Pat. No. 5,252,742 at column 1, line 45 to column 6, line 65;
U.S. Pat. No. 5,359,085 at column 5, line 25 to column 19, line 55;
U.S. Pat. No. 5,488,119 at column 1, line 29 to column 7, line 65;
U.S. Pat. No. 5,821,287 at column 3, line 5 to column 11, line 39;
U.S. Pat. No. 6,113,814 at column 2, line 23 to column 23, line 29;
U.S. Pat. No. 6,153,126 at column 2, line 18 to column 8, line 60;
U.S. Pat. No. 6,296,785 at column 2 line 47 to column 31, line 5;
U.S. Pat. No. 6,348,604 at column 3, line 26 to column-17, line 15; and
U.S. Pat. No. 6,353,102 at column 1, line 62 to column 11, line 64.

Spiro(indoline)pyrans are also described in the text, *Techniques in Chemistry*, Volume III, "Photochromism", Chapter 3, Glenn H. Brown, Editor, John Wiley and Sons, Inc., New York, 1971. In addition, it is contemplated that organic photochromic materials such as photochromic pigments and photochromic compounds encapsulated in metal oxides can be used in the photochromic coating. See, for example, the materials described in U.S. Pat. Nos. 4,166,043 and 4,367,170.

The photochromic coating of the present invention can contain one photochromic compound or a mixture of two or more photochromic compounds, as desired. Mixtures of photochromic compounds can be used to attain certain activated colors such as a near neutral gray or near neutral brown. See, for example, U.S. Pat. No. 5,645,767, column 12, line 66 to column 13, line 19, which describes the parameters that define neutral gray and brown colors.

The photochromic compound(s) described herein can be incorporated into the curable coating composition by addition to the coating composition and/or by dissolving the compound(s) in a solvent before being added to the curable coating composition. Alternatively, although more involved, the photochromic compound(s) can be incorporated into the cured polymer coating by imbibition, permeation, diffusion or other transfer methods, which methods are known to those skilled in the art of dye transfer into host materials.

In addition to photochromic materials, the photochromic coating (or precursor formulation) can contain additional conventional adjuvants that impart desired properties or characteristics to the coating, that are required by the process used to apply and cure the photochromic coating on the surface of the plastic substrate, or that enhance the performance of the coating. Such adjuvants include, but are not limited to, ultraviolet light absorbers, light stabilizers, such as hindered amine light stabilizers (HALS), asymmetric diaryloxalamide (oxanilide) compounds, and singlet oxygen quenchers, e.g., a nickel ion complex with an organic ligand, antioxidants, polyphenolic antioxidants, heat stabilizers, rheology control agents, leveling agents, e.g., surfactants, free radical scavengers and adhesion promoting agents, such as trialkoxy silanes, e.g., silanes having an alkoxy radical of 1 to 4 carbon atoms, including γ-glycidoxypropyl trimethoxy silane, γ-aminopropyl trimethoxysilane, 3,4-epoxy cyclohexylethyl trimethoxysilane, dimethyldiethoxysilane, aminoethyl trimethoxysilane, and 3-(trimethoxysilyl)propyl methacrylate. Mixtures of such photochromic performance enhancing adjuvant materials are contemplated. See, for example, the materials described in U.S. Pat. Nos. 4,720,356, 5,391,327 and 5,770,115.

Compatible (chemically and color-wise) tints, e.g., dyes, can also be added to the photochromic coating formulation or applied to the plastic substrate for medical reasons or for reasons of fashion, e.g., to achieve a more aesthetic result. The particular dye selected can vary and will depend on the aforesaid need and result to be achieved. In one embodiment, the dye can be selected to complement the color resulting from the activated photochromic materials used, e.g., to achieve a more neutral color or absorb a particular wavelength or incident light. In another contemplated embodiment, the dye can be selected to provide a desired hue to the substrate and/or coating when the photochromic coating is in an unactivated state.

The photochromic coating composition can be applied to the surface of the plastic substrate as a polymerizable formulation and then cured (polymerized) by methods well known to those skilled in the art including, but not limited to, photopolymerization, thermal polymerization (including infrared polymerization), and other sources of radiation. Such application methods include the art-recognized methods of spin coating, curtain coating, dip coating, spray coating or by methods used in preparing overlays. Such methods are described in U.S. Pat. No. 4,873,029.

When applied as a polymerizable formulation, the photochromic coating formulation will also typically contain a catalyst or polymerization initiator. The amount of catalyst/polymerization initiator(s) used to polymerize the polymerizable components of the photochromic coating formulation can vary and will depend on the particular initiator and the polymerizable monomers used. Typically, only that amount that is required to initiate (catalyze) and sustain the polymerization reaction is required, i.e., an initiating or catalytic amount. Generally, from 0 to 10 weight percent, e.g., from 0.01 to 8 weight percent, more typically from 0.1 to 5 weight percent, based on the total weight of the polymerizable monomer(s) in the formulation, of at least one catalyst and/or polymerization initiator, including photoinitiators is used. The amount of catalyst/initiator can range between any combinations of the aforestated values, inclusive of the recited values. The catalyst(s)/initiator(s) will be selected from those materials that can be used to polymerize the particular monomer(s) used to produce the polymeric coating chosen as the photochromic host, and that will not impair significantly the function of the photochromic materials that are included in the coating formulation.

For example, catalysts that can be used to cure polyurethane reaction mixtures can be selected from the group consisting of Lewis bases, Lewis acids and insertion catalysts described in Ullmann's Encyclopedia of Industrial Chemistry, 5$^{th}$ Edition, 1992, Volume A21, pp. 673 to 674. Usually the catalyst is an organo tin catalyst, e.g., tin octylate, dibutyl tin dilaurate, dibutyl tin diacetate, dibutyl tin mercaptide, dibutyl tin dimaleate, dimethyl tin diacetate, dimethyl tin dilaurate and 1,4-diazabicyclo[2.2.2]octane.

Mixtures of tin catalysts can be used. Other tin catalysts described in the art can be used as well.

Epoxy resin coating compositions typically contain a polyacid curing agent having a high average acid functionality, i.e., two or more acid groups per molecule. Typically, the acid group is a carboxylic acid group. Non-limiting examples of polycarboxylic acids include dicarboxylic acids such as oxalic, malonic, succinic, tartaric, glutaric, adipic, sebacic, maleic, fumaric, phthalic, isophthalic, terephthalic, and dodecanedioc acids; tricarboxylic acids such as citric acid; and tetracarboxylic acids such as 1,2,3,4-butane tetracarboxylic acid.

Polyanhydride coating compositions typically contain an amine compound as the curing catalyst. Non-limiting examples of amine compounds include dimethyl cocoamine, dimethyl dodecylamine, triethylamine, triethanolamine and phenolic compounds containing at least two dialklyamino groups. Aminoplast resin and alkoxyacrylamide polymer coating compositions commonly contain an acidic material as a catalyst. Non-limiting examples include phosphoric acid or substituted phosphoric acids, such as alkyl acid phosphate and phenyl acid phosphate; and sulfonic acids or substituted sulfonic acids, such as para-toluene sulfonic acid, dodecylbenzene sulfonic acid and dinonylnaphthalene sulfonic acid.

Acrylic/methacrylic monomer-based coating compositions can contain thermal initiators, e.g., initiators that produce free radicals, such as organic peroxy compounds or azobis(organonitrile) compounds, photoinitiators or mixtures of such initiators.

Non-limiting examples of suitable organic peroxy compounds include peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropyl peroxydicarbonate; diacyl peroxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters, such as t-butylperoxy pivalate, t-butylperoxy octylate, and t-butylperoxy isobutyrate; methylethylketone peroxide; and acetylcyclohexane sulfonyl peroxide.

Non-limiting examples of suitable azobis(organonitrile) compounds include azobis(isobutyronitrile), 2,2'-azobis(2,4-dimethylpentanenitrile), 1,1'-azobiscyclohexanecarbonitrile, and azobis(2,4-dimethylvaleronitrile) and mixtures of such azo thermal initiators. Desired thermal initiators are those that do not discolor the resulting coating or decompose the photochromic material incorporated within the polymerizable coating composition.

Photopolymerization can be performed in the presence of at least one photoinitiator using ultraviolet light and/or visible light, if photoinitiators are required. Photoinitiators, which are free radical initiators, are classified in two major groups based upon their mode of action. Cleavage-type photoinitiators include, but are not limited to, acetophenones, α-aminoalkylphenones, benzoin ethers, benzoyl oximes, acylphosphine oxides and bisacylphosphine oxides. Abstraction-type photoinitiators include, but are not limited to, benzophenone, Michler's ketone, thioxanthone, anthraquinone, camphorquinone, fluorone and ketocoumarin. Abstraction-type photoinitiators function better in the presence of materials such as amines and other hydrogen donor materials added to provide labile hydrogen atoms for abstraction. Typical hydrogen donors have an active hydrogen positioned alpha to an oxygen or nitrogen, e.g., alcohols, ethers and tertiary amines, or an active hydrogen atom directly attached to sulfur, e.g., thiols. In the absence of such added materials, photoinitiation can still occur via hydrogen abstraction from monomers, oligomers or other components of the system.

Non-limiting examples of photopolymerization initiators that can be used include benzil, benzoin, benzoin methyl ether, benzoin isobutyl ether, benzophenol, acetophenone, benzophenone, 4,4'-dichlorobenzophenone, 4,4'-bis(N,N'-dimethylamino) benzophenone, diethoxyacetophenone, fluorones, e.g., the H-Nu series of initiators available from Spectra Group Limited, 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, such as 2,6-dimethylbenzoyl diphenyl phosphine oxide, 2,4,6-trimethylbenzoyl diphenyl phosphine oxide, 2,6-dichlorobenzoyl diphenyl phosphine oxide, and 2,6-dimethoxybenzoyl diphenyl phosphine oxide; bisacylphosphine oxides, such as bis(2,6-dimethyoxybenzoyl)-2,4,4-trimethylpentyl phosphine oxide, bis(2,6-dimethylbenzoyl)-2,4,4-trimethylpentyl phosphine oxide, bis (2,4,6-trimethylbenzoyl)-2,4,4-trimethylpentyl phosphine oxide, and bis(2,6-dichlorobenzoyl)-2,4,4-trimethylpentyl phosphine oxide; phenyl-4-octyloxyphenyliodonium hexafluoroantimonate, dodecyldiphenyliodonium hexafluoroantimonate, (4-(2-tetradecanol)oxyphenyl)-iodonium hexafluoroantimonate and mixtures of such photo polymerization initiators.

The source of radiation used for photopolymerization is selected from those sources that emit ultraviolet light and/or visible light. The source of radiation can be a mercury lamp, a mercury lamp doped with $FeI_3$ and/or $GaI_3$, a germicidal lamp, a xenon lamp, a tungsten lamp, a metal halide lamp or a combination of such lamps. Typically, the absorbance spectra of the photoinitiator(s) is matched with the spectral output of the light source bulb, e.g., an H bulb, D bulb, Q bulb and/or V bulb, for highest curing efficiency. The exposure time of the curable coating to the light source will vary depending upon the wavelength and intensity of the light source, the photoinitiator, and thickness of the coating. Generally, the exposure time will be sufficient to substantially cure the coating, or produce a coating that is cured sufficiently to allow physical handling followed by a post thermal cure. The photochromic coating can also be cured using an electron beam process that does not require the presence of a thermal or photoinitiator.

Solvents can also be present in the coating formulation in order to dissolve and/or disperse the components of the coating formulation. Typically, a solvating amount of solvent is used, e.g., an amount which is sufficient to solubilize/disperse the solid components in the coating formulation. Commonly, from 10 to 80 weight percent of solvent material, based on the total weight of the coating formulation, is used.

Solvents include, but are not limited to, benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinyl pyrrolidinone, N-acetyl pyrrolidinone, N-hydroxymethylpyrrolidinone, N-butyl pyrrolidinone, N-ethyl pyrrolidinone, N-(N-octyl) pyrrolidinone, N-(N-dodecyl)pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, mono- and dialkyl ethers of ethylene glycol and their derivatives, which are sold as CELLOSOLVE industrial solvents, and mixtures of such solvents.

In a further contemplated embodiment, the photochromic polymeric coating can be applied as a water-borne coating, e.g., as aqueous polymer dispersion, such as a latex, with or without the presence of an organic solvent. This type of system is a two-phase system comprising an aqueous phase and an organic phase, which is dispersed in the aqueous phase. Use of water-borne coatings is well known in the art. See, for example, U.S. Pat. No. 5,728,769, which relates to aqueous urethane resins and coatings prepared from such resins, and the patents referred to in the '769 patent.

After the photochromic coating formulation is applied to the surface of the plastic substrate, it is cured (polymerized) by exposure to ultraviolet or electron beam radiation, or is thermally cured. The specific cure conditions used will depend on the plastic substrate, the polymerizable components in the formulation and the type of catalyst/initiator used, or in the case of electron beam radiation, the intensity of the electron beam. Thermal curing can involve heating from room temperature up to temperatures below which the plastic substrate is not damaged due to such heating. Temperatures up to 200° C. have been reported. Such cure conditions are well known in the art. For example, a typical thermal cure cycle involves heating the formulation from room temperature (22° C.) to from 85 to 125° C. over a period of from 2 to 20 minutes. The time required for ultraviolet or electron beam radiation cures is generally shorter than a thermal cure, e.g., from 5 seconds to 5 minutes, and will depend on the intensity (power) of the radiation. When the thermal or UV/electron beam cure conditions produce a coating that can be physically handled but is not completely cured, an additional thermal post cure step can also be employed to fully cure the photochromic coating.

Prior to applying the photochromic coating to the surface of the plastic substrate, the surface of the substrate is often cleaned and treated to provide a clean surface and a surface that will enhance adhesion of the photochromic coating to the substrate. Effective cleaning and treatments commonly used include, but are not limited to, ultrasonic washing with an aqueous soap/detergent solution, cleaning with an aqueous mixture of organic solvent, e.g., a 50:50 mixture of isopropanol:water or ethanol:water, UV treatment, activated gas treatment, e.g., treatment with low temperature plasma or corona discharge, as described earlier, and chemical treatment that results in hydroxylation of the substrate surface, e.g., etching of the surface with an aqueous solution of alkali metal hydroxide, e.g., sodium or potassium hydroxide, which solution can also contain a fluorosurfactant. Generally, the alkali metal hydroxide solution is a dilute aqueous solution, e.g., from 5 to 40 weight percent, more typically from 10 to 15 weight percent, such as 12 weight percent, alkali metal hydroxide. See, for example, U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

In some cases, a primer coating is applied to the plastic surface substrate before application of the photochromic coating. The primer coating is interposed between the organic substrate and the photochromic polymeric coating, and serves as a barrier coating to prevent interaction of the components comprising the photochromic polymeric coating with the substrate and vice versa, and/or as an adhesive layer to promote adhesion of the photochromic coating to the plastic substrate. The primer can be applied to the plastic substrate by any of the methods used to apply the photochromic coating, e.g., spray, spin, spread, curtain, roll or dip coating; and can be applied to a cleaned and untreated or cleaned and treated, e.g., chemically treated, surface of the substrate. Primer coatings are well known to those skilled in the art. Selection of an appropriate primer coating will depend on the plastic substrate used and the particular photochromic coating, e.g., the primer coating must be chemically and physically compatible with the surface of the plastic substrate and the photochromic coating, while providing the functional benefits desired for the primer coating, e.g., barrier and adhesive properties.

The primer coating can be one or several monomolecular layers thick, and can range from 0.1 to 10 microns, more usually from 0.1 to 2 or 3 microns in thickness. The thickness of the primer can vary between any combination of the aforementioned values, inclusive of the recited values. One contemplated embodiment of a suitable primer coating comprises an organofunctional silane, such as methacryloxypropyl trimethoxysilane, a catalyst of a material that generates acid on exposure to actinic radiation, e.g., onium salts, and an organic solvent, such as diglyme or isopropyl alcohol, as described in U.S. Pat. No. 6,150,430. A further example of a primer coating is described in U.S. Pat. No. 6,025,026, which describes a composition that is substantially free of organosiloxanes and which comprises organic anhydrides having at least one ethylenic linkage and an isocyanate-containing material.

In a further contemplated embodiment, an abrasion-resistant coating is superposed, e.g., superimposed, on the dendritic polyester acrylate film. In such an embodiment, the post thermal cure of the dendritic polyester acrylate film can be postponed until after application of the abrasion-resistant coating if there is no significant physical handling of the dendritic polyester acrylate film coated product until after application of the abrasion-resistant coating. If such extensive handling is required, it is suggested that the thermal post cure of the dendritic polyester acrylate film be performed prior to application of the abrasion-resistant coating.

The cured dendritic polyester acrylate film should be transparent, more particularly, optically clear when used for optical, e.g., ophthalmic, applications, and not significantly impair the optical properties of the photochromic coated substrate. For example, the dendritic polyester acrylate film should permit a sufficient quantity of the appropriate UV radiation to pass through it in order to activate the photochromic materials incorporated into the photochromic polymeric coating appended to the substrate. The terms "transparent" and "optically clear" are defined earlier in this disclosure. The surface of the cured dendritic polyester acrylate film(s) is desirably harder than the photochromic coating to which it is applied, and is usually softer than the abrasion-resistant coating that is commonly applied to the dendritic polyester acrylate film. As described, the cured dendritic polyester acrylate film should adhere well to the photochromic coating and be compatible with abrasion resistant coatings that are prepared with organo-silane(s). Further, it is desirable, but not imperative, that the cured dendritic polyester film be resistant to treatment, e.g., removal, with aqueous inorganic caustic solutions, e.g., dilute aqueous sodium or potassium hydroxide solutions, as described subsequently herein.

The radiation cured dendritic polyester acrylate film should desirably adhere firmly to the photochromic coating applied to the plastic substrate. Adhesion can be determined by the conventional art recognized crosshatch tape peel adhesion test, and by a boiling water crosshatch tape peel adhesion test, which is a more stringent test. The former is often referred to as the primary (1°) test or dry test; while the later is often referred to as the secondary (2°) or wet test. In the primary test, a cutting tool composed of eleven blades spaced approximately 1 mm apart (tip to tip) and 0.65 mm thick is used to make a first long cut on the sample followed by second and third cuts, which are made at 90 degrees to and across the first cut. The second and third cuts are separated from each other to provide separate crosshatch zones. A piece of Scotch 3M masking tape one inch (2.54 cm) wide and 2 to 2½ inches long (5 to 6.3 cm) is applied in the direction of the first cut and pressed down to smooth out any bubbles. The tape is then peeled off the surface with a sharp, rapid, even and continuous movement. The procedure is repeated with a fresh piece of tape. A small piece of tape (1½ inches, 3.8 cm) is applied to each of the crosshatch zones produced by the second and third cuts in a direction 90 degrees to the direction of the first tape, and these pieces of tape also peeled off the surface with a sharp, rapid, even and continuous movement. If 30 percent or less of the squares of the grid produced by the cutting tool are found to have debonded from the substrate (photochromic coating), i.e., at least 70 percent of the grids remain intact, the coating is deemed to pass the adhesion test. More particularly, it is desirable that no more than 20, particularly no more than 10 squares, still more particularly, no more than 5 squares, e.g., 1 square, out of a 100 squares of the grid de-bond from the substrate. In accordance with the present invention, the radiation-cured dendritic polyester acrylate film should pass the crosshatch tape peel adhesion test to be considered to have adhered to the photochromic coating. Stated differently, if the radiation-cured dendritic polyester acrylate film passes the crosshatch tape peel test, it is referred to herein as being coherently appended (or cohesively appended) or attached to the layer, e.g., the photochromic coating, to which it is appended.

A further more severe adhesion test, is the secondary or wet adhesion test, which optionally can be performed to assess the adhesion of the radiation-cured dendritic polyester acrylate film to the photochromic coating. This further test, namely, the boiling water cross-hatch adhesion test, involves placing the test sample, e.g., lens, which has been scored with cross hatches, as described above, in boiling deionized water for 30 minutes. After the test sample has cooled to room temperature, the crosshatch tape peel adhesion test, as described above, is performed again. The same pass/fail requirements that were described for the crosshatch adhesion test are used for this boiling water modification of the test.

The radiation-cured dendritic polyester acrylate film is, in one contemplated embodiment, resistant to treatment, e.g., removal, by aqueous inorganic caustic solutions, e.g., relatively dilute alkali metal hydroxide solutions, such as solutions of sodium hydroxide or potassium hydroxide. The film is considered to be resistant to removal by such solutions if the thickness of the film is reduced not more than 0.5 micron after exposure to 12.5% aqueous potassium hydroxide at 140° F. (60° C.) for four minutes. Desirably, the film thickness is not reduced more than 0.5 microns after two exposures, more desirably after three exposures, to the aqueous potassium hydroxide solution.

The radiation-cured dendritic polyester acrylate film is desirably also compatible with abrasion-resistant coatings (hard coat), particularly abrasion-resistant coatings comprising organo silane material(s), that are used to protect plastic surfaces from abrasion, scratches, etc. Organo silane-containing abrasion-resistant coatings, often referred to as hard coats or silane-based hard coatings, are well known in the art, and are commercially available from various manufacturers, such as SDC Coatings, Inc. and PPG Industries, Inc. Reference is made to column 5, lines 1–45 of U.S. Pat. No. 4,756,973, and to column 1, lines 58 through column 2, line 8, and column 3, line 52 through column 5, line 50 of U.S. Pat. No. 5,462,806 which disclosures describe organo silane hard coatings. Reference is also made to U.S. Pat. Nos. 4,731,264, 5,134,191, 5,231,156 and International Patent Publication WO 94/20581 for disclosures of organo silane hard coatings.

While a described physical feature of the radiation-cured dendritic polyester acrylate film is that it be compatible with organo silane hard coatings, other coatings that provide abrasion and scratch resistance, such as polyfunctional acrylic hard coatings, melamine-based hard coatings, urethane-based hard coatings, alkyd-based coatings, silica sol-based hard coatings or other organic or inorganic/organic hybrid hard coatings can be used as the abrasion-resistant coating. One skilled in the art can readily determine if the dendritic polyester acrylate film is compatible with organo silane hard coats by applying an organo silane hard coat to the dendritic polyester acrylate film and determining the compatibility of the dendritic polyester acrylate film to that hard coat by means of the cross-hatch tape peel adhesion test, which is performed on the hard coat.

Another method of determining compatibility of the dendritic polyester acrylate film to the hard coat is the absence of crazing in the hard coat after it has been applied to the dendritic polyester acrylate film and cured. By crazing is meant the presence of fractures in the hard coat. Such fractures are sometimes readily apparent by observation; however, the fractures can be very fine and observable by magnification under bright light. The light source can consist of a high intensity white arc light of a 75 watt Xenon bulb, with the light being projected vertically down through the hard coat.

By use of the term "compatible with an organo silane abrasion resistant coating (hard coat)" is meant that the dendritic polyester acrylate film is capable of having an organo silane hard coat deposited on its surface and that the organo silane hard coat adheres to the dendritic polyester acrylate film under ordinary handling/wear conditions, as determined by the crosshatch tape peel adhesion test or the absence of crazing in the hard coat. Naturally, the organo silane hard coat can be removed by treatment with concentrated aqueous caustic, or severe mechanical abrasion. Further, the term abrasion-resistant organo silane-containing coating (or other such similar meaning terms) is meant that the abrasion-resistant coating is prepared from a composition comprising at least one organo silane.

It is contemplated that, if required, a primer coating can be applied to the dendritic polyester acrylate film before applying the abrasion-resistant coating on top of it. Such primer coatings are known in the art. Selection of an appropriate primer coating will depend on the particular dendritic polyester acrylate film and abrasion-resistant coating used, i.e., the primer coating must be chemically and physically compatible (non-reactive) with the surfaces that it abuts. The primer coating can be one or several monomolecular layers thick, and can range from 0.1 to 10 microns, e.g., from 0.1 to 2 or 3 microns, in thickness. Such primer coatings are discussed herein in relation to the photochromic coating, and that discussion is applicable here also.

In one embodiment, the hard coat can be prepared from a composition comprising from 35 to 95 weight percent, as calculated solids, of at least one organo silane monomer represented by the following empirical formula VIII:

$$R^1SiW_3 \qquad \text{VIII}$$

wherein $R^1$ is glycidoxy($C_1$–$C_{20}$)alkyl, desirably glycidoxy ($C_1$–$C_{10}$)alkyl, and more desirably, glycidoxy ($C_1$–$C_4$)alkyl; W is hydrogen, halogen, hydroxy, $C_1$–$C_5$ alkoxy, $C_1$–$C_5$ alkoxy($C_1$–$C_5$)alkoxy, $C_1$–$C_4$ acyloxy, phenoxy, $C_1$–$C_3$ alkylphenoxy, or $C_1$–$C_3$ alkoxyphenoxy, said halogen being bromo, chloro or fluoro. Typically, W is hydrogen, halogen, hydroxy, $C_1$–$C_3$ alkoxy, $C_1$–$C_3$ alkoxy($C_1$–$C_3$)alkoxy, $C_1$–$C_2$ acyloxy, phenoxy, $C_1$–$C_2$ alkylphenoxy, or $C_1$–$C_2$ alkoxyphenoxy, and the halogen is chloro or fluoro. More typically, W is hydroxy, $C_1$–$C_3$ alkoxy, $C_1$–$C_3$ alkoxy($C_1$–$C_3$)alkoxy, $C_1$–$C_2$ acyloxy, phenoxy, $C_1$–$C_2$ alkylphenoxy, or $C_1$–$C_2$ alkoxyphenoxy.

The weight percent, as calculated solids, of silane monomer(s) represented by empirical formula VIII in the hard coat composition is typically from 40 to 90, more typically from 45 to 85, and still more typically from 50 to 70 weight percent. The weight percent calculated solids are determined as the percent of the silanol that theoretically forms during hydrolysis of the orthosilicate.

Non-limiting examples of silane monomers represented by general formula VIII include:
glycidoxymethyltriethoxysilane,
glycidoxymethyltrimethoxysilane,
alpha-glycidoxyethyltrimethoxysilane,
alpha-glycidoxyethyltriethoxysilane,
alpha-glycidoxypropyltrimethoxysilane,
alpha-glycidoxypropyltriethoxysilane,
alpha-glycidoxypropyltrimethoxysilane,
alpha-glycidoxypropyltriethoxysilane,
beta-glycidoxyethyltrimethoxysilane,
beta-glycidoxyethyltriethoxysilane,
beta-glycidoxypropyltrimethoxysilane,
beta-glycidoxypropyltriethoxysilane,
beta-glycidoxybutyltrimethoxysilane,
beta-glycidoxybutyltriethoxysilane,
gamma-glycidoxypropyltrimethoxysilane,
gamma-glycidoxypropyltriethoxysilane,
gamma-glycidoxypropyltripropoxysilane,
gamma-glycidoxypropyltributoxysilane,
gamma-glycidoxypropyltrimethoxysilane,
gamma-glycidoxypropyltriphenoxysilane,
gamma-glycidoxybutyltrimethoxysilane,
gamma-glycidoxybutyltriethoxysilane,
delta-glycidoxybutyltrimethoxysilane,
delta-glycidoxybutyltriethoxysilane, hydrolyzates of such silane monomers, and mixtures of such silane monomers and hydrolyzates thereof.

The hard coat composition of the foregoing described embodiments can further include from 5 to 65 weight percent, as calculated solids, of: (a) silane monomers represented by empirical formula IX; (b) metal alkoxides represented by empirical formula X; or (c) a mixture thereof in a weight ratio of (a):(b) of from 1:100 to 100:1. Typically, the hard coat composition includes from 10 to 60 weight percent calculated solids, more typically from 15 to 55, and still more typically from 30 to 50 weight percent calculated solids of the aforementioned materials (a), (b) or (c).

The hard coat composition can include at least one silane monomer represented by the following empirical formula IX:

$$R^2{}_b(R^3)_cSiZ_{4-(b+c)} \qquad \text{IX}$$

wherein $R^2$ can be $C_1$–$C_{20}$ alkyl, $C_1$–$C_{20}$ haloalkyl, $C_2$–$C_{20}$ alkenyl, $C_2$–$C_{20}$ haloalkenyl, phenyl, phenyl($C_1$–$C_{20}$)alkyl, $C_1$–$C_{20}$ alkylphenyl, phenyl($C_2$–$C_{20}$)alkenyl, $C_2$–$C_{20}$ alkenylphenyl, morpholino, amino($C_1$–$C_{20}$)alkyl, amino($C_2$–$C_{20}$)alkenyl, mercapto($C_1$–$C_{20}$)alkyl, mercapto($C_2$–$C_{20}$)alkenyl, cyano($C_1$–$C_{20}$)alkyl, cyano($C_2$–$C_{20}$)alkenyl, acryloxy, methacryloxy, or halogen. The halo or halogen can be bromo, chloro, or fluoro. Typically, $R^2$ is a $C_1$–$C_{10}$ alkyl, $C_1$–$C_{10}$ haloalkyl, $C_2$–$C_{10}$ alkenyl, phenyl, phenyl($C_1$–$C_{10}$)alkyl, $C_1$–$C_{10}$ alkylphenyl, morpholino, amino($C_1$–$C_{10}$) alkyl, amino($C_2$–$C_{10}$) alkenyl, mercapto($C_1$–$C_{10}$)alkyl, mercapto($C_2$–$C_{10}$) alkenyl, cyano($C_1$–$C_{10}$) alkyl, cyano($C_2$–$C_{10}$)alkenyl, or halogen and the halo or halogen is chloro or fluoro.

In formula IX, $R^3$ can be $C_1$–$C_{20}$ alkylene, $C_2$–$C_{20}$ alkenylene, phenylene, $C_1$–$C_{20}$ alkylenephenylene, amino($C_1$–$C_{20}$)alkylene, amino($C_2$–$C_{20}$)alkenylene; Z can be hydrogen, halogen, hydroxy, $C_1$–$C_5$ alkoxy, $C_1$–$C_5$ alkoxy($C_1$–$C_5$)alkoxy, $C_1$–$C_4$ acyloxy, phenoxy, $C_1$–$C_3$ alkylphenoxy, or $C_1$–$C_3$ alkoxyphenoxy, said halo or halogen being bromo, chloro or fluoro; b and c are each an integer of from 0 to 2; and the sum of b and c is an integer of from 0 to 3. Typically, $R^3$ is $C_1$–$C_{10}$ alkylene, $C_2$–$C_{10}$ alkenylene, phenylene, $C_1$–$C_{10}$ alkylenephenylene, amino($C_1$–$C_{10}$)alkylene, amino($C_2$–$C_{10}$)alkenylene, Z is hydrogen, halogen, hydroxy, $C_1$–$C_3$ alkoxy, $C_1$–$C_3$ alkoxy($C_1$–$C_3$)alkoxy, $C_1$–$C_2$ acyloxy, phenoxy, $C_1$–$C_2$ alkylphenoxy, or $C_1$–$C_2$ alkoxyphenoxy, and the halo or halogen is chloro or fluoro.

Non-limiting examples of silane monomers represented by general formula IX include methyltrimethoxysilane, methyl-triethoxysilane, methyltrimethoxyethoxysilane, methyltri-acetoxysilane, methyltripropoxysilane, methyltributoxysilane, ethyltrimethoxysilane, ethyltriethoxysilane, and gamma-methacryloxypropyltrimethoxysilane, gamma-aminopropyltrimethoxysilane, gamma-aminopropyltriethoxysilane, gamma-mercaptopropyltrimethoxysilane, chloromethyltrimethoxysilane, chloromethyltriethoxysilane, dimethyldiethoxysilane, gamma-chloropropylmethyldimethoxysilane, gamma-chloropropyl-methyldiethoxysilane, tetramethylorthosilicate, tetraethylorthosilicate, hydrolyzates of such silane monomers, and mixtures of such silane monomers and hydrolyzates thereof.

The hard coat composition can further include at least one compound represented by empirical formula X:

$$M(T)_q \qquad \text{X}$$

wherein M is a metal chosen from aluminum, antimony, tantalum, titanium or zirconium; T is $C_1$–$C_{10}$ alkoxy and q is an integer equivalent to the valence of M. Usually, M is chosen from aluminum, titanium or zirconium and T is $C_1$–$C_5$ alkoxy, e.g., propoxy.

The hard coat composition can also include from 0 to 20 weight percent, based on the total weight of the composition, of a metal oxide chosen from silicon dioxide (silica), aluminum oxide (alumina), antimony oxide, tin oxide, titanium oxide, zirconium oxide or mixtures of such metal oxides. The metal oxide can be in the form of a sol. As used in the present specification, the term sol means and includes a colloidal dispersion of finely divided solid inorganic metal oxide particles in an aqueous or an organic liquid. The average size of such particles can range from 1 to 200 nanometers, typically from 2 to 100 nanometers, and more typically, from 5 to 50 nanometers.

Such metal oxide sols can be prepared by hydrolyzing a metal salt precursor for a time sufficient to form the desired particle size or such sols can be purchased commercially.

Examples of commercially available metal oxide sols that can be used in the hard coat composition include NALCO® colloidal sols (available from NALCO Chemical Co.), REMASOL® colloidal sols (available from Remet Corp.) and LUDOX® colloidal sols (available from E. I. du Pont de Nemours Co., Inc.). Stable acidic and alkaline metal oxide sols are commercially available as aqueous dispersions. Usually, the metal oxide is silica or alumina supplied in the form of an acid stabilized colloidal silica, acid stabilized colloidal alumina, e.g., NALCO® 8676, or an acid stabilized alumina coated silica sol, e.g., NALCO® 1056. Metal oxide sols can also be obtained as dispersions in organic liquids, e.g., ethanol, isopropyl alcohol, ethylene glycol and 2 propoxyethanol.

The hard coat composition also contains a catalytic amount of a water-soluble acid catalyst. A catalytic amount is that amount which is sufficient to cause polycondensation of the silane monomer(s). Typically, the catalytic amount of acid catalyst will range from 0.01 to 10 weight percent, based on the total weight of the hard coat composition. The water-soluble acid catalyst can be an organic carboxylic acid or an inorganic acid. Examples of suitable catalysts include acetic acid, formic acid, glutaric acid, maleic acid, nitric acid, sulfuric acid and hydrochloric acid.

Organic solvents present in the hard coat composition can be added or formed in situ by the hydrolysis of the silane monomer(s). Useful organic solvents are those that will dissolve or disperse the solid components of the coating composition. The minimum amount of solvent present in the coating composition is a solvating amount, i.e., an amount that is sufficient to solubilize or disperse the solid components in the coating composition. For example, the amount of solvent present can range from 20 to 90 weight percent based on the total weight of the coating composition and depends, in part, on the amount of silane monomer present in the coating composition. Examples of solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinylpyrrolidinone, N-acetylpyrrolidinone, N-hydroxymethylpyrrolidinone, N-butyl-pyrrolidinone, N-ethylpyrrolidinone, N-(N-octyl)-pyrrolidinone, N-(n-dodecyl)pyrrolidinone, 2-methoxyethyl ether, xylene, cyclohexane, 3-methylcyclohexanone, ethyl acetate, butyl acetate, tetrahydrofuran, methanol, amyl propionate, methyl propionate, diethylene glycol monobutyl ether, dimethyl sulfoxide, dimethyl formamide, ethylene glycol, mono- and dialkyl ethers of ethylene glycol and their derivatives, which are sold under the trade name CELLOSOLVE industrial solvents, propylene glycol methyl ether and propylene glycol methyl ether acetate, which are sold under the trade name DOWANOL® PM and PMA solvents, respectively, and mixtures of such solvents.

A leveling amount of nonionic surfactant(s) can be present as a component in the hard coat composition. A leveling amount is that amount which is sufficient to allow the coating to spread evenly or to level the hard coat composition on the surface of the dendritic polyester acrylate film to which it is applied. Typically, the nonionic surfactant is a liquid at the conditions of use and is used in amounts from about 0.05 to about 1.0 weight percent based on the amount of the silane monomer(s). Suitable nonionic surfactants are described in the *Kirk Othmer Encyclopedia of Chemical Technology*, 3rd Edition, Volume 22, pages 360 to 377. Other potential nonionic surfactants include the surfactants described in U.S. Pat. No. 5,580,819, column 7, line 32 to column 8, line 46.

Non-limiting examples of nonionic surfactants that can be used in the hard coat composition include ethoxylated alkyl phenols, such as the IGEPAL® DM surfactants or octylphenoxypolyethoxyethanol, which is sold as TRITON® X-100, an acetylenic diol such as 2,4,7,9-tetramethyl-5-decyne-4,7-diol, which is sold as SURFYNOL® 104, ethoxylated acetylenic diols, such as the SURFYNOL® 400 surfactant series, fluoro-surfactants, such as the FLUORAD® fluorochemical surfactant series, and capped nonionics, such as the benzyl capped octyl phenol ethoxylates, which is sold as TRITON® CF87, the propylene oxide capped alkyl ethoxylates, which are available as the PLURAFAC® RA series of surfactants, octylphenoxyhexadecylethoxy benzyl ether, polyether modified dimethylpolysiloxane copolymer in solvent, which is sold as BYK®-306 additive by Byk Chemie and mixtures of such recited surfactants.

Water is also present in the hard coat composition in an amount sufficient to form hydrolysates of the silane monomer(s). The water present in the optional metal oxide sol can supply the amount of water necessary. If not, additional water can be added to the coating composition to provide the required additional amount necessary to hydrolyze the silane monomer(s).

The abrasion-resistant coating (hard coat) can be applied to the dendritic polyester acrylate film using the same application techniques described with respect to the photochromic coating and the dendritic polyester acrylate film, e.g., spin coating. The abrasion resistant film can be applied at a thickness of from 0.5 to 10 microns. Prior to applying the hard coat, e.g., the organo silane hard coat, to the dendritic polyester acrylate film, the dendritic polyester acrylate film can be treated to enhance its receptivity of and adhesion of the hard coat. Such treatments, e.g., plasma treatments, as are described above with respect to pretreatment of the photochromic coating prior to application of the dendritic polyester acrylate film can be used.

In a further embodiment of the present invention, additional coatings, such as antireflective coatings, can be applied to the hard coat layer. Examples of antireflective coatings are described in U.S. Pat. No. 6,175,450 and International Patent Publication WO 00/33111.

The present invention is more particularly described in the following examples, which are intended as illustrative only, since numerous modifications and variations therein will be apparent to those skilled in the art. In the examples, percentages are reported as weight percent, unless otherwise specified. Materials, such as monomers, catalysts, initiators, etc., which are identified in one example by a lower case letter in parenthesis and which are used in other examples, are identified in the subsequent examples with the same lower case number.

EXAMPLE 1

In the following example, plano PDQ coated polycarbonate lenses obtained from Gentex Optics were used. The test lenses were treated with an oxygen plasma for 1 minute using a Plasmatech machine at a power setting of 100 Watts while introducing oxygen at a rate of 100 ml/min into the vacuum chamber of the Plasmatech machine. The lenses were then rinsed with deionized water and dried with air. A photochromic polyurethane coating composition was applied to the plasma treated lenses by spin coating and thermally cured. The components of the polyurethane composition and their amounts are tabulated in Table 1. The components of the polyurethane composition were mixed for 30 minutes at 60° C., followed by 30 minutes of mixing at ambient temperature prior to being applied to the lenses. The photochromic polyurethane coating was approximately 20 microns thick.

TABLE 1

Formulation

| Component/ | Amount, Grams |
|---|---|
| Desmodur PL 3175A (a) | 2.6 |
| Vestanat B 1358A (b) | 7.6 |
| PC 1122 (c) | 8.0 |
| HCS 6234 polyol (d) | 1.9 |
| Tinuvin 144 UV stabilizer (e) | 0.36 |
| A-187 (f) | 0.53 |
| N-methyl pyrrolidinone | 5.6 |
| Photochromic Material (g) | 0.58 |
| L-5340 surfactant (h) | 0.05 |
| Dibutyltin dilaurate | 0.16 |

(a) Methyl ethyl ketoxime blocked hexamethylene diisocyanate (Bayer)
(b) Methyl ethyl ketoxime blocked isophorone diisocyanate trimer (CreaNova, Inc.)
(c) Polyhexane carbonate diol (Stahl)
(d) Polyacrylate polyol (Composition D in Example 1 of U.S. Pat. No. 6,187,444 B1)
(e) Hindered amine light stabilizer (Ciba-Geigy)
(f) γGlycidoxypropyl trimethoxysilane coupling agent (OSi)
(g) A mixture of naphthopyran photochromic materials in proportions designed to give a gray tint to the coating when activated by UV radiation.
(h) Surfactant (Niax)

Two coating preparations were prepared using 15 grams each of the dendritic polyester acrylate PRO-5249. PRO-5249 dendritic polyester acrylate is reported by its supplier to be a 50/50 blend of neopentylglycol-2-propoxylated diacrylate and a dendritic polyester acrylate in which approximately 13 of the 16 terminal hydroxy groups have been acrylated. The first coating preparation used neat PRO 5249 without a photoinitiator; while the second coating preparation contained 0.038 grams (0.25 weight %) of BAPO photoinitiator [bis(2,4,6-trimethylbenzoyl) phenyl phosphine oxide].

The photochromic polyurethane coating on the test lenses were treated by plasma discharge using the Plasmatech machine using the same conditions used to treat the uncoated plano lenses. The dendritic polyester acrylate coating preparations were applied to the test lenses by spin coating to give a wet film weight of approximately 0.06 grams (approximately 10 microns thickness). The coatings were cured in a nitrogen atmosphere with UV light from a D bulb. Subsequently, 4 lenses (2 with the BAPO photoinitiator and 2 without photoinitiator) were plasma treated using the Plasmatech machine using the same conditions used to treat the uncoated plano lenses, and then hard coated with a siloxane-based hard coat (HI-GARD 1035 available from PPG Industries, Inc.). The hard coat thickness was approximately 2 microns. All of the samples were post baked in a convection oven for 3 hours at 100° C. The test, lenses were tested for adhesion using the primary and secondary crosshatch tape peel, adhesion test, and for hard-coat compatibility by observing the level of crazing after curing of the hard coat. All of the test lenses coated with the dendritic polyester acrylate coatings (with and without photoinitiator) but without a hard coat were found to have 100% adhesion in both the primary (dry) and secondary (wet) crosshatch tape, peel adhesion tests. The hard coated lenses (no photoinitiator) were found to have 100% adhesion (primary crosshatch) and 90% adhesion (secondary crosshatch) respectively. The hard coated lenses (with photoinitiator) were found to have 90% adhesion (primary crosshatch) and 70% adhesion (secondary crosshatch) respectively. All of the hard coats were observed to have no crazing, which indicates that the hard coat was compatible with the dendritic polyester acrylate coating.

Dendritic polyester acrylate film coated test lenses were transparent and had a light transmission of 86%. Dendritic polyester acrylate film coated test lenses were exposed to UV light and observed to reversibly change color.

EXAMPLE 2

The procedures of Example 1 were followed using plano PDQ polycarbonate lenses obtained from Gentex Optics, except that the dendritic polyester coating solutions were prepared using 5 grams of PRO 5249 dendritic polyester acrylate and 0.0125 grams (0.25 weight %) of BAPO photoinitiator. Further, one coating solution contained in addition 0.25 grams of γ-glycidoxypropyl trimethoxysilane (A-187).

The test lenses were treated with a plasma discharge, as described in Example 1, and coated with a photochromic polyurethane coating of the type described in Example 1, and the dendritic polyester acrylate coating solutions were applied by spin coating to the photochromic polyurethane coatings and cured in the manner described in Example 1. Two lenses were plasma treated, as described in Example 1, and hard coated with a siloxane-based hard coat. All lenses were post baked in a convection oven for 3 hours at 100° C. Tests for adhesion and hard coat compatibility were performed, as described in Example 1. All of the lenses containing the A-187 silane additive (with and without hard coat) were found to have 100% adhesion (primary crosshatch and secondary crosshatch). Further, the hard coats showed no crazing after curing. Lenses.without the A-187 silane additive and without a hard coat were found to have 100% adhesion (primary crosshatch and secondary crosshatch), while lenses with the hard coat were found to have 100% adhesion (primary crosshatch) and 40% adhesion (secondary crosshatch). These lenses also showed no crazing of the hard coat.

Although the present invention has been described with reference to specific details of certain embodiments thereof, it is not intended that such details should be regarded as limitations upon the scope of the invention except insofar as they are included in the accompanying claims.

What is claimed is:

1. A photochromic article comprising:
   (a) a rigid substrate,
   (b) a photochromic organic polymeric coating appended to at least a portion of at least one surface of said substrate, said polymeric coating comprising a photochromic amount of at least one photochromic material, and
   (c) a transparent dendritic polyester acrylate film superposed on said photochromic polymeric coating.

2. The photochromic article of claim 1 wherein the dendritic polyester acrylate film is prepared from a liquid composition prepared by acrylating a dendritic polyester macromolecule and an organic alcohol having a molecular weight of less than 2000.

3. The photochromic article of claim 1 wherein the dendritic polyester acrylate film is prepared from a composition comprising dendritic polyester acrylate and at least one other radiation or thermally curable acrylic material.

4. The photochromic article of claim 3 wherein the at least one other radiation or thermally curable acrylic material is (meth)acrylic monomeric material selected from monoacrylates and polyacrylates.

5. The photochromic article of claim 4 wherein the polyacrylate is a diacrylate, triacrylate or mixture of diacrylate(s) and triacrylate(s).

6. The photochromic article of claim 4 wherein the weight ratio of the dendritic polyester acrylate to the other radiation or thermally curable (meth)acrylic monomeric material(s) ranges from 90:10 to 10:90.

7. The photochromic article of claim 6 wherein the weight ratio of the dendritic polyester acrylate to the other radiation or thermally curable (meth)acrylic monomeric material(s) ranges from 70:30 to 30:70.

8. The photochromic article of claim 6 wherein the weight ratio of the dendritic polyester acrylate to the other radiation or thermally curable (meth)acrylic monomeric material(s) ranges from 60:40 to 40:60.

9. The photochromic article of claim 3 wherein at least one photoinitiator is present in photoinitiating amounts in the composition comprising the dendritic polyester acrylate and the at least one other radiation curable acrylic material.

10. The photochromic article of claim 4 wherein the dendritic polyester acrylate film is prepared from a composition further comprising at least one other radiation curable monomeric material containing polymerizable group(s), other than acrylic functional groups, said at least one other radiation curable monomeric material being present in amounts of up to 40 weight percent of said composition.

11. The photochromic article of claim 4 wherein at least one photoinitiator is present in photoinitiating amounts in the composition comprising the dendritic polyester acrylate.

12. The photochromic article of claim 11 wherein the at least one photoinitiator is present in an amount of from 0.1 to 10 weight percent.

13. The photochromic article of claim 11 wherein the at least one photoinitiator is present in an amount of from 0.5 to 6 weight percent.

14. The photochromic article of claim 1 further comprising an abrasion-resistant coating superposed on the surface of the dendritic polyester acrylate film.

15. The photochromic article of claim 14 wherein the abrasion-resistant coating comprises an organo silane-based coating.

16. The photochromic article of claim 14 further comprising an antireflective coating affixed to the surface of the abrasion-resistant film.

17. The photochromic article of claim 1 wherein the thickness of the dendritic polyester acrylate film ranges from 2 to 20 microns.

18. The photochromic article of claim 1 wherein the dendritic polyester acrylate film is compatible with abrasion-resistant organo silane-containing coatings.

19. The photochromic article of claim 18 wherein the photochromic organic polymeric coating is softer than the dendritic polyester acrylate film.

20. The photochromic article of claim 1 wherein the rigid substrate is an organic polymeric substrate chosen from thermoset or thermoplastic materials having a refractive index of from 1.48 to 1.74.

21. The photochromic article of claim 20 wherein the polymeric substrate is a substrate chosen from thermoset substrates prepared from polymerizable compositions comprising allyl diglycol carbonate monomer(s), substrates prepared from thermoplastic polycarbonates, substrates prepared from polyurea urethanes or substrates prepared from compositions comprising the reaction product of polyfunctional isocyanate(s) and/or isothiocyanate(s) with polythiol or polyepisulfide monomer(s).

22. The photochromic article of claim 21 wherein the allyl diglycol carbonate is diethylene glycol bis(allyl carbonate).

23. The photochromic article of claim 1 wherein the photochromic organic polymeric coating is chosen from photochromic polyurethane-based coatings, photochromic polyurea urethane-based coatings, photochromic poly(meth) acrylic-based coatings, photochromic aminoplast resin-based coatings, or photochromic epoxy resin-based coatings.

24. The photochromic article of claim 1 wherein the photochromic material is an organic photochromic material chosen from photochromic spirooxazines, benzopyrans, naphthopyrans, fulgides, metal dithizonates, diarylethenes or mixtures of such photochromic materials.

25. The photochromic article of claim 24 wherein the photochromic naphthopyran is chosen from naphtho[1,2-b] pyrans, naphtho[2,1-b]pyrans, spiro-9-fluoreno[1,2-b]pyrans, phenanthropyrans, quinopyrans or indeno-fused naphthopyrans, and the spirooxazine is chosen from naphthoxazines or spiro (indoline)pyridobenzoxazines.

26. A photochromic: article comprising:
    (a) a transparent rigid organic polymeric substrate,
    (b) a photochromic organic polymeric coating appended to at least a portion of at least one surface of said polymeric substrate, said polymeric coating comprising a photochromic amount of at least one organic photochromic material, and
    (c) a transparent dendritic polyester acrylate film coherently appended to said photochromic polymeric coating.

27. The photochromic article of claim 26 wherein the polymeric substrate is chosen from thermoset or thermoplastic materials having a refractive index of from 1.48 to 1.74.

28. The photochromic article of claim 26 wherein the polymeric substrate is a substrate chosen from thermoset substrates prepared from polymerizable compositions comprising allyl diglycol carbonate monomer(s), substrates prepared from thermoplastic polycarbonates, substrates prepared from polyurea urethanes or substrates prepared from compositions comprising the reaction product of polyfunctional isocyanate(s) and/or isothiocyanate(s) with polythiol or polyepisulfide monomer(s).

29. The photochromic article of claim 28 wherein the dendritic polyester acrylate film is prepared from a liquid composition prepared by acrylating a dendritic polyester macromolecule and an organic alcohol having a molecular weight of less than 2000.

30. The photochromic article of claim 28 wherein the dendritic polyester acrylate film is prepared from a composition comprising dendritic polyester acrylate and at least one other radiation curable acrylic material, and said at least one other radiation curable acrylic material is (meth)acrylic monomeric material chosen from monoacrylates, polyacrylates and mixtures of such acrylic materials.

31. The photochromic article of claim 30 wherein the dendritic polyester acrylate film is prepared from a composition comprising dendritic polyester acrylate and neopentylglycol-2-propoxylate diacrylate.

32. The photochromic article of claim 30 wherein at least one photoinitiator is present in photoinitiating amounts in the composition comprising the dendritic polyester acrylate.

33. The photochromic article of claim 26 further comprising an abrasion-resistant coating affixed to the surface of the dendritic polyester acrylate film.

34. The photochromic article of claim 33 wherein the abrasion-resistant coating comprises an organo silane-based coating.

35. The photochromic article of claim 33 further comprising an antireflective coating affixed to the surface of the abrasion-resistant film.

36. A photochromic article comprising:
(a) a transparent organic polymeric substrate chosen from thermoset substrates prepared from polymerizable compositions comprising allyl diglycol carbonate monomer(s), substrates prepared from thermoplastic polycarbonates, substrates prepared from polyurea urethanes or substrates prepared from compositions comprising the reaction product of polyfunctional isocyanate(s) and/or isothiocyanates with polythiols or polyepisulfide monomer(s), said substrate having a refractive index of from 1.48 to 1.74,
(b) a transparent photochromic organic polymeric coating appended to at least one surface of said polymeric substrate, said polymeric coating comprising a photochromic amount of at least one organic photochromic material chosen from spirooxazines, benzopyrans, naphthopyrans, fulgides, metal dithizonates, diarylethenes, or mixtures of such photochromic materials, said photochromic polymeric coating having a thickness of from 5 to 200 microns, and
(c) radiation-cured, transparent dendritic polyester acrylate film coherently appended to said photochromic polymeric coating.

37. The photochromic article of claim 36 wherein the photochromic coating is chosen from photochromic polyurethane-based coatings, photochromic polyurea urethane-based coatings, photochromic poly(meth)acrylic-based coatings, photochromic aminoplast resin-based coatings, or photochromic epoxy resin-based coatings, and has a thickness of from 10 to 50 microns.

38. The photochromic article of claim 36 further comprising an abrasion-resistant coating affixed to the surface of the dendritic polyester acrylate film.

39. The photochromic article of claim 38 wherein the abrasion-resistant coating comprises an organo silane-based coating.

40. The photochromic article of claim 38 further comprising an antireflective coating affixed to the surface of the abrasion-resistant coating.

41. The photochromic article of claim 36 wherein the polymeric substrate is a substrate comprising a thermoplastic polycarbonate.

42. The photochromic article of claim 41 wherein the dendritic polyester acrylate film is prepared from a composition comprising dendritic polyester acrylate and at least one other radiation curable acrylic material.

43. The photochromic article of claim 42 wherein the at least one other radiation curable acrylic material is (meth)acrylate monomeric material(s) chosen from monoacrylates or polyacrylates.

44. The photochromic article of claim 43 wherein the polyacrylate material(s) is a diacrylate, triacrylate or mixture of diacrylate(s) and triacrylate(s).

45. The photochromic article of claim 43 wherein the weight ratio of the dendritic polyester acrylate to the other radiation curable (meth)acrylate acrylic material(s) ranges from 70:30 to 30:70.

46. The photochromic article of claim 36 wherein the dendritic polyester acrylate film is prepared from a liquid composition prepared by acrylating a dendritic polyester macromolecule and an aliphatic alcohol having a molecular weight of from 60 to 1000.

47. The photochromic article of claim 41 wherein the photochromic coating is chosen from photochromic polyurethane-based coatings, photochromic polyurea urethane-based coatings, photochromic poly(meth)acrylic-based coatings, photochromic aminoplast resin-based coatings, or photochromic epoxy resin-based coatings, and has a thickness of from 10 to 50 microns, and the dendritic polyester acrylate film is prepared from a composition comprising dendritic polyester acrylate and at least one other radiation curable (meth)acrylic material.

48. The photochromic article of claim 47 wherein at least one photoinitiator is present in amounts of from 0.1 to 10 weight percent in the composition comprising the dendritic polyester acrylate and the at least one other radiation curable (meth) acrylic material.

49. The photochromic article of claim 48 wherein the article is an ophthalmic article.

50. The photochromic article of claim 49 wherein the ophthalmic article is a lens.

51. The photochromic article of claim 50 further comprising an abrasion-resistant coating affixed to the surface of the dendritic polyester acrylate film.

52. The photochromic article of claim 51 further comprising an antireflective coating affixed to the surface of the abrasion-resistant coating.

53. The photochromic article of claim 42 wherein at least one photoinitiator is present in photoinitiating amounts in the composition comprising the dendritic polyester acrylate and the at least one other radiation curable acrylic material.

54. The photochromic article of claim 53 wherein the at least one photoinitiator is present in amounts of from 0.5 to 6 weight percent.

55. The photochromic article of claim 36, wherein the article is an ophthalmic article.

56. The photochromic article of claim 55 wherein the ophthalmic article is a lens.

* * * * *